United States Patent
Lu et al.

(10) Patent No.: US 12,316,898 B2
(45) Date of Patent: May 27, 2025

(54) DISPLAY APPARATUS AND METHOD FOR THE DISPLAY APPARATUS

(71) Applicant: HISENSE VISUAL TECHNOLOGY CO., LTD., Shandong (CN)

(72) Inventors: Pingguang Lu, Shandong (CN); Junhou Jiang, Shandong (CN); Hao Wang, Shandong (CN); Ruiji Zhang, Shandong (CN); Chong Chen, Shandong (CN); Xinlei Yu, Shandong (CN); Yinghao He, Shandong (CN); Tingfu Xie, Shandong (CN); Fang Liu, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 18/342,036

(22) Filed: Jun. 27, 2023

(65) Prior Publication Data

US 2023/0345069 A1 Oct. 26, 2023

Related U.S. Application Data

(63) Continuation of application No. PCT/CN2022/073399, filed on Jan. 24, 2022.

(30) Foreign Application Priority Data

Jan. 14, 2021 (CN) .......................... 202110046140.2
Jun. 30, 2021 (CN) .......................... 202110736156.6
(Continued)

(51) Int. Cl.
*H04N 21/41* (2011.01)
*G06F 9/4401* (2018.01)
(Continued)

(52) U.S. Cl.
CPC ....... *H04N 21/4108* (2013.01); *G06F 9/4411* (2013.01); *G06F 21/73* (2013.01);
(Continued)

(58) Field of Classification Search
CPC ........... H04N 21/4108; H04N 21/4518; H04N 21/43635; H04N 21/43615;
(Continued)

(56) References Cited

U.S. PATENT DOCUMENTS 9,274,739 B2 * 3/2016 Gachon ..................... G06F 3/14
9,892,020 B1 2/2018 Ophir et al.
(Continued)

FOREIGN PATENT DOCUMENTS

CN 1716415 A 1/2006
CN 101101388 A 1/2008
(Continued)

OTHER PUBLICATIONS

International Search Report, mailed Mar. 14, 2022, from PCT/CN2022/073399.
(Continued)

*Primary Examiner* — John W Miller
*Assistant Examiner* — Sean N. Haiem
(74) *Attorney, Agent, or Firm* — Workman Nydegger

(57) ABSTRACT

Disclosed are a display apparatus and a method. The method includes: in response to detecting that an external device is connected via an external device interface of the display apparatus, obtaining SPD data from the external device; reading device identification information from the SPD data; in response to the device model being found in a device management list pre-stored in the display apparatus, switching a version of the transmission protocol to a version of the transmission protocol matched with the device model stored in the device management list; in response to the device
(Continued)

mode being not found in the device management list, detecting a tag for indicating a new version function; in response to the tag for indicating the new version function being detected, switching the version of the transmission protocol to the first version; otherwise, switching the version of the transmission protocol to the second version.

12 Claims, 20 Drawing Sheets

(30) Foreign Application Priority Data

Jul. 16, 2021 (CN) .......................... 202110805331.2
Sep. 16, 2021 (CN) .......................... 202111087473.6

(51) Int. Cl.
| | |
|---|---|
| G06F 21/73 | (2013.01) |
| H04L 12/28 | (2006.01) |
| H04L 43/0817 | (2022.01) |
| H04L 61/00 | (2022.01) |
| H04N 21/4363 | (2011.01) |
| H04N 21/442 | (2011.01) |
| H04N 21/4425 | (2011.01) |
| H04N 21/45 | (2011.01) |

(52) U.S. Cl.
CPC ...... *H04L 12/2823* (2013.01); *H04L 43/0817* (2013.01); *H04L 61/00* (2013.01); *H04N 21/43635* (2013.01); *H04N 21/44231* (2013.01); *H04N 21/4425* (2013.01); *H04N 21/4518* (2020.08)

(58) Field of Classification Search
CPC ........... H04N 21/4516; H04N 21/4425; H04N 21/44231; G09G 5/006; G06F 21/73; G06F 9/4411; H04L 61/00; H04L 43/0817; H04L 12/2823
USPC ........................................................ 348/554
See application file for complete search history.

(56) References Cited

U.S. PATENT DOCUMENTS

| | | | |
|---|---|---|---|
| 10,448,109 B1 | 10/2019 | Galep et al. | |
| 2003/0191863 A1 | 10/2003 | Greenblat | |
| 2005/0266923 A1 | 12/2005 | Ishii et al. | |
| 2007/0287495 A1 | 12/2007 | Takuma | |
| 2008/0051642 A1 | 2/2008 | Krupnik | |
| 2008/0055318 A1 | 3/2008 | Glen | |
| 2008/0088635 A1 | 4/2008 | Callway et al. | |
| 2008/0254740 A1 | 10/2008 | Tofigh et al. | |
| 2008/0263219 A1 | 10/2008 | Bacchi et al. | |
| 2009/0150961 A1* | 6/2009 | Kabuto ................ H04N 13/194 |
| | | | 725/118 |
| 2010/0182402 A1 | 7/2010 | Nakajima et al. | |
| 2011/0141232 A1* | 6/2011 | Tsukagoshi .......... H04N 13/156 |
| | | | 348/E13.001 |
| 2011/0302318 A1 | 12/2011 | Birger | |
| 2013/0009868 A1 | 1/2013 | Sako et al. | |
| 2013/0150158 A1 | 6/2013 | Kang et al. | |
| 2014/0036155 A1 | 2/2014 | Guo et al. | |
| 2014/0071236 A1 | 3/2014 | Tsukagoshi | |
| 2014/0082516 A1 | 3/2014 | Huang | |
| 2014/0123190 A1 | 5/2014 | Song et al. | |
| 2015/0052253 A1 | 2/2015 | Johnson et al. | |
| 2015/0142991 A1 | 5/2015 | Zaloom | |
| 2015/0163450 A1 | 6/2015 | Miyoshi | |
| 2015/0347074 A1 | 12/2015 | Park et al. | |
| 2016/0088345 A1 | 3/2016 | Huang | |
| 2017/0092226 A1* | 3/2017 | Park ................ H04N 21/43635 |
| 2017/0111484 A1 | 4/2017 | Song | |
| 2017/0134799 A1* | 5/2017 | Park ................... H04N 21/4516 |
| 2017/0220496 A1 | 8/2017 | Colenbrander | |
| 2017/0238051 A1* | 8/2017 | Park ........................ H04L 41/00 |
| | | | 348/730 |
| 2017/0311031 A1 | 10/2017 | Nakajima | |
| 2018/0082123 A1 | 3/2018 | Katz et al. | |
| 2019/0052923 A1 | 2/2019 | Stransky-Heilkron et al. | |
| 2019/0222793 A1 | 7/2019 | Fan | |
| 2019/0230412 A1 | 7/2019 | Sun | |
| 2019/0244579 A1 | 8/2019 | Oh et al. | |
| 2019/0253742 A1 | 8/2019 | Garten et al. | |
| 2019/0348010 A1* | 11/2019 | Oh ........................ G09G 5/006 |
| 2020/0076133 A1 | 3/2020 | Shen | |
| 2020/0092594 A1 | 3/2020 | Kasai et al. | |
| 2020/0125229 A1 | 4/2020 | Xu et al. | |
| 2020/0186891 A1* | 6/2020 | Yu .................... H04N 21/42684 |
| 2020/0226087 A1 | 7/2020 | Sun | |
| 2020/0234499 A1 | 7/2020 | Hwang et al. | |
| 2020/0234617 A1 | 7/2020 | Chang et al. | |
| 2020/0365112 A1 | 11/2020 | Oh | |
| 2020/0381417 A1 | 12/2020 | Salcedo et al. | |
| 2021/0014565 A1* | 1/2021 | Zamudio ............ H04N 21/4516 |
| 2023/0199246 A1* | 6/2023 | Kim ........................ G06T 5/92 |
| | | | 348/441 |

FOREIGN PATENT DOCUMENTS

| | | | |
|---|---|---|---|
| CN | 101247491 A | 8/2008 | |
| CN | 101506868 A | 8/2009 | |
| CN | 101554047 A | 10/2009 | |
| CN | 101568028 A | 10/2009 | |
| CN | 101627625 A | 1/2010 | |
| CN | 102223581 A | 10/2011 | |
| CN | 102663448 A | 9/2012 | |
| CN | 103079662 A | 5/2013 | |
| CN | 103442294 A | 12/2013 | |
| CN | 103503430 A | 1/2014 | |
| CN | 103577175 A | 2/2014 | |
| CN | 104363496 A | 2/2015 | |
| CN | 104378688 A | 2/2015 | |
| CN | 1045884571 A | 4/2015 | |
| CN | 105007395 A | 10/2015 | |
| CN | 105025382 A | 11/2015 | |
| CN | 105302518 A | 2/2016 | |
| CN | 105323386 A | 2/2016 | |
| CN | 105430519 A | 3/2016 | |
| CN | 105828012 A | 8/2016 | |
| CN | 105828213 A | 8/2016 | |
| CN | 106100904 A | 11/2016 | |
| CN | 106250837 A | 12/2016 | |
| CN | 106604121 A | 4/2017 | |
| CN | 106851169 A | 6/2017 | |
| CN | 107197370 A | 9/2017 | |
| CN | 107948709 A | 4/2018 | |
| CN | 107959889 A | 4/2018 | |
| CN | 108063978 A | 5/2018 | |
| CN | 108322817 A | 7/2018 | |
| CN | 108476337 A | 8/2018 | |
| CN | 108696732 A | 10/2018 | |
| CN | 108702466 A | 10/2018 | |
| CN | 108924573 A | 11/2018 | |
| CN | 108924592 A | 11/2018 | |
| CN | 109040739 A | 12/2018 | |
| CN | 109168062 A | 1/2019 | |
| CN | 109300431 A | 2/2019 | |
| CN | 109450851 A | 3/2019 | |
| CN | 109495761 A | 3/2019 | |
| CN | 109901901 A | 6/2019 | |
| CN | 109977731 A | 7/2019 | |
| CN | 109999494 A | 7/2019 | |
| CN | 110062186 A | 7/2019 | |
| CN | 110457694 A | 11/2019 | |
| CN | 110933490 A | 3/2020 | |
| CN | 110996153 A | 4/2020 | |
| CN | 111131889 A | 5/2020 | |
| CN | 111292115 A | 6/2020 | |
| CN | 111405338 A | 7/2020 | |
| CN | 111462711 A | 7/2020 | |
| CN | 111629259 A | 9/2020 | |

(56) References Cited

FOREIGN PATENT DOCUMENTS

| | | |
|---|---|---|
| CN | 111918132 A | 11/2020 |
| CN | 111954061 A | 11/2020 |
| CN | 112018103 A | 12/2020 |
| CN | 112040305 A | 12/2020 |
| CN | 112203154 A | 1/2021 |
| EP | 1675343 A1 | 6/2006 |
| EP | 3474559 A1 | 4/2019 |
| EP | 3637225 A1 | 4/2020 |
| JP | 2005229352 A | 8/2005 |
| JP | 2007-158903 A | 6/2007 |
| JP | 2007-251543 A | 9/2007 |
| JP | 2008-011367 A | 1/2008 |
| JP | 2011166315 A | 8/2011 |
| JP | 2012-034139 A | 2/2012 |
| JP | 2013098997 A | 5/2013 |
| WO | 2016/011720 A1 | 1/2016 |
| WO | 2017/177768 A1 | 10/2017 |
| WO | 2018/021885 A1 | 2/2018 |
| WO | 2018/076376 A1 | 5/2018 |
| WO | 2020/056734 A1 | 3/2020 |
| WO | 2020/063062 A1 | 4/2020 |
| WO | 2020/233295 A1 | 11/2020 |
| WO | 2020/264409 A1 | 12/2020 |
| WO | 2021/232506 A1 | 11/2021 |

OTHER PUBLICATIONS

Chinese First Office Action, mailed Jul. 21, 2022, from Chinese App. No. 202110805331.2.
Chinese Second Office Action, mailed Feb. 5, 2023, from Chinese App. No. 202111087473.6.
Chinese First Office Action, mailed Jul. 21, 2022, from Chinese App. No. 202111087473.6.
HHH-fpga, "HDMI 2.1 Transition Process", Nov. 17, 2020, http://www.cnblogs.com/hhh-fpga/p/14015429.html, English Abstract Submitted.
Yamamoto, Koji et al., "Fast Face Clustering Using Similar Shots For Face Navigation of TV Programs", 2009 IEEE 13th International Symposium on Consumer Electronics, Jul. 6, 2009.
Chen, "Design of remote switching control algorithm for muld-band signal source in distributed communication network", Journal of Jilin University (Engineering and technology Edition), vol. 50, No. 5, Sep. 2020, 8 Pages. (English Abstract Available).
Gao et al., "Quality elevation technique for UHD video and its VLSI solution", Journal of Chongqing University of Posts and Telecommunications( Natural Science Edition), vol. 32, No. 5, Oct. 2020, 17 Pages. (English Abstract Available).
International Preliminary Report on Patentability received for PCT Patent Application No. PCT/CN2022/073399, mailed on Jul. 27, 2023, 5 pages (2 pages of English Translation and 3 pages of Original Document).
International Search Report and Written Opinion received for PCT Patent Application No. PCT/CN2022/071778, mailed on Apr. 13, 2022, 4 pages (2 pages of English Translation and 2 pages of Original Document).
International Search Report and Written Opinion received for PCT Patent Application No. PCT/CN2022/071779, mailed on Apr. 13, 2022, 5 pages (3 pages of English Translation and 2 pages of Original Document).
International Search Report and Written Opinion received for PCT Patent Application No. PCT/CN2022/071780, mailed on Apr. 13, 2022, 6 pages (3 pages of English Translation and 3 pages of Original Document).
International Search Report and Written Opinion received for PCT Patent Application No. PCT/CN2022/073399, mailed on Mar. 14, 2022, 11 pages (5 pages of English Translation and 6 pages of Original Document).
International Search Report and Written Opinion received for PCT Patent Application No. PCT/CN2022/073400, mailed on Apr. 20, 2022, 4 pages (2 pages of English Translation and 2 pages of Original Document).
Ke Xiaowan et al., "Teleservices CQT Automatic Control Protocol Design", Engineering and Design, Feb. 6, 2010, pp. 54-59. (English Abstract Available).
Kun T., "Implementation of System Controller Module and System Verification of Real-Time UHD FRUC System", Dec. 2014, 101 Pages. (English Abstract Available).
Liu Hao, "Network Assited Dynamic Adaptive Streaming Over HTTP", Nov. 30, 2015, 58 Pages, (English Abstract Available).
Notification to Grant Patent Right for Invention received for Chinese Patent Application No. 202110290744.1, mailed on Sep. 8, 2022, 6 pages (2 pages of English Translation and 4 pages of Original Document).
Notification to Grant Patent Right for Invention received for Chinese Patent Application No. 202110805331.2, mailed on Jan. 16, 2023, 6 pages (2 pages of English Translation and 4 pages of Original Document).
Office Action received for Chinese Patent Application No. 202110290744.1, mailed on Jul. 29, 2022, 13 pages (6 pages of English Translation and 7 pages of Original Document).
Office Action received for Chinese Patent Application No. 202110290755. X mailed on Jul. 29, 2022, 27 pages (12 pages of English Translation and 15 pages of Original Document).
Office Action received for Chinese Patent Application No. 202110290755.X, mailed on Dec. 22, 2022, 10 pages (5 pages of English Translation and 5 pages of Original Document).
Office Action received for Chinese Patent Application No. 202110291950.4 mailed on Jul. 29, 2022, 12 pages (5 pages of English Translation and 7 pages of Original Document).
Office Action received for Chinese Patent Application No. 202110291950.4, mailed on Feb. 18, 2023, 8 pages (3 pages of English Translation and 5 pages of Original Document).
Office Action received for Chinese Patent Application No. 202110292422.0, mailed on Aug. 17, 2022, 16 pages (7 pages of English Translation and 9 pages of Original Document).
Office Action received for Chinese Patent Application No. 202110292422.0, mailed on Sep. 28, 2023, 23 pages (12 pages of English Translation and 11 pages of Original Document).
Office Action received for Chinese Patent Application No. 202110292449.X, mailed on Aug. 1, 2022, 10 pages (3 pages of English Translation and 7 pages of Original Document).
Office Action received for Chinese Patent Application No. 202110292465.9, mailed on Aug. 1, 2022, 15 pages (6 pages of English Translation and 9 pages of Original Document).
Office Action received for Chinese Patent Application No. 202110292465.9, mailed on Jan. 20, 2023, 10 pages (4 pages of English Translation and 6 pages of Original Document).
Office Action received for Chinese Patent Application No. 202110292875.3 mailed on Aug. 1, 2022, 13 pages (5 pages of English Translation and 8 pages of Original Document).
Office Action received for Chinese Patent Application No. 202110292875.3, mailed on Jan. 30, 2023, 14 pages (6 pages of English Translation and 8 pages of Original Document).
Office Action received for Chinese Patent Application No. 202110649246.1, mailed on Aug. 2, 2022, 9 pages (3 pages of English Translation and 6 pages of Original Document).
Xiao-Feng, "HDMI Interface Analysis", China digital cable TV, 2013, pp. 468-470. (English Abstract Available).
Yang et al., "A must-have for high-end color TVs is HDMI 2.1 change of leadership is imperative", Household appliances, No. 9, Sep. 1, 2020, 2 Pages. (English Abstract Available).

* cited by examiner

DISPLAY APPARATUS AND METHOD FOR THE DISPLAY APPARATUS

This application is a continuation application of International Application No. PCT/CN2022/073399 filed on Jan. 24, 2022, which claims the priorities from Chinese Patent Application No. 202110046140.2 filed on Jan. 14, 2021; Chinese Patent Application No. 202111087473.6 filed on Sep. 16, 2021; Chinese Patent Application No. 202110805331.2 filed on Jul. 16, 2021; and Chinese Patent Application No. 202110736156.6 filed on Jun. 30, 2021, which are hereby incorporated by references in their entireties.

FIELD

The disclosure relates to the display technology, and in particular, to a display apparatus and a method.

BACKGROUND

The display apparatus can be connected with a game device via a HDMI port. While a user is using a game device, the game device can output the video data and audio data by running a game-related program. The video data and audio data can be sent to the display apparatus based on a HDMI protocol, and output via the display apparatus' screen and speaker to realize the play of the video and audio from the game device. When a plurality of external devices are connected with the display apparatus, the user can select the audio and video data input to the display apparatus by selecting the signal source.

SUMMARY

Some embodiments of the disclosure provide a display apparatus. the display apparatus includes: a display configured to display an image from broadcast system or Internet, and/or, a user interface; an external device interface configured to connect with an external device; a memory, configured to store instructions and data associated with the display; and at least one processor, in connection with the display, the external device interface and the memory. The at least one processor is configured to execute the instructions to cause the display apparatus to: in response to detecting that the external device is connected via the external device interface, obtain Source Product Description (SPD) data from the external device; read device identification information from the SPD data, where the device identification information comprises a device type and a device model, the device type comprises a game device, and the device model is used for identifying a version of a transmission protocol supported by the game device; in response to the device model being found in a device management list pre-stored in the display apparatus, switch a version of the transmission protocol in the display apparatus to a version of the transmission protocol matched with the device model stored in the device management list; in response to the device mode being not found in the device management list, detect a tag for indicating a new version function, wherein the tag for indicating the new version function is a tag added to transmission data during configuration of the new version function in the external device, and the new version function is an additional transmission function of a first version of transmission protocol with respect to a prior second version of transmission protocol; in response to the tag for indicating the new version function being detected, switch the version the transmission protocol to the first version, where the transmission protocol comprises HDMI protocol; and in response to the tag for indicating the new version being not detected, switch the version of the transmission protocol to the second version.

Some embodiments of the disclosure provide a method for the display apparatus. The method includes: in response to detecting that an external device is connected via an external device interface of the display apparatus, obtaining Source Product Description (SPD) data from the external device; reading device identification information from the SPD data, where the device identification information comprises a device type and a device model, the device type comprises a game device, and the device model is used for identifying a version of a transmission protocol supported by the game device; in response to the device model being found in a device management list pre-stored in the display apparatus, switching a version of the transmission protocol in the display apparatus to a version of the transmission protocol matched with the device model stored in the device management list; in response to the device mode being not found in the device management list, detecting a tag for indicating a new version function, wherein the tag for indicating the new version function is a tag added to transmission data during configuration of the new version function in the external device, and the new version function is an additional transmission function of a first version of transmission protocol with respect to a prior second version of transmission protocol; in response to the tag for indicating the new version function being detected, switching the version of the transmission protocol to the first version, wherein the transmission protocol comprises HDMI protocol; and in response to the tag for indicating the new version being not detected, switching the version of the transmission protocol to the second version.

DETAILED DESCRIPTION

In order to make the purposes, embodiments and advantages of the disclosure clearer, the embodiments of the disclosure will be described clearly and completely below in combination with the accompanying drawings in embodiments of the disclosure. Obviously the described embodiments are only some but not all the embodiments.

Some of the terms involved in this application are explained as follows.

Refresh Rate: also known as Field Frequency, refers to the vertical scan frequency of a screen, that is, how many times per second a screen is able to draw a new image. It is measured in Hertz (Hz). The higher the refresh rate, the more times the image is refreshed, the smaller the flickering of the image display, and the higher the picture quality.

Screen tearing: when a previous frame of picture (Frame (n)) on the screen has not completely disappeared, a new frame of picture (Frame (n+1)) is output to the display, and two different frames of pictures appear on the screen at the same time, that is, one scanning signal (Scan) period corresponds to two frames of pictures. In this case, the refresh point of the screen has not arrived, and the screen tearing can appear on the screen.

The backlight frequency is an adjustment frequency of a backlight Pulse Width Modulation (PWM) signal of a Light-Emitting Diode (LED) in the backlight module of the screen panel.

The Variable Refresh Rate (VRR) is a technology that allows the display to dynamically adjust its refresh rate based on the output frequency of the GPU, and is mainly used (in games) to reduce or eliminate the screen lagging, stuttering, tearing, etc., to ensure the display fluency and detail presentation of the picture.

Local Dimming a plurality of partitions are obtained by dividing the display area of the entire screen, and then the brightness of each partition (that is, local area) of the screen is adjusted individually, rather than overall brightness adjustment for the entire display area of the screen.

Figure 1:
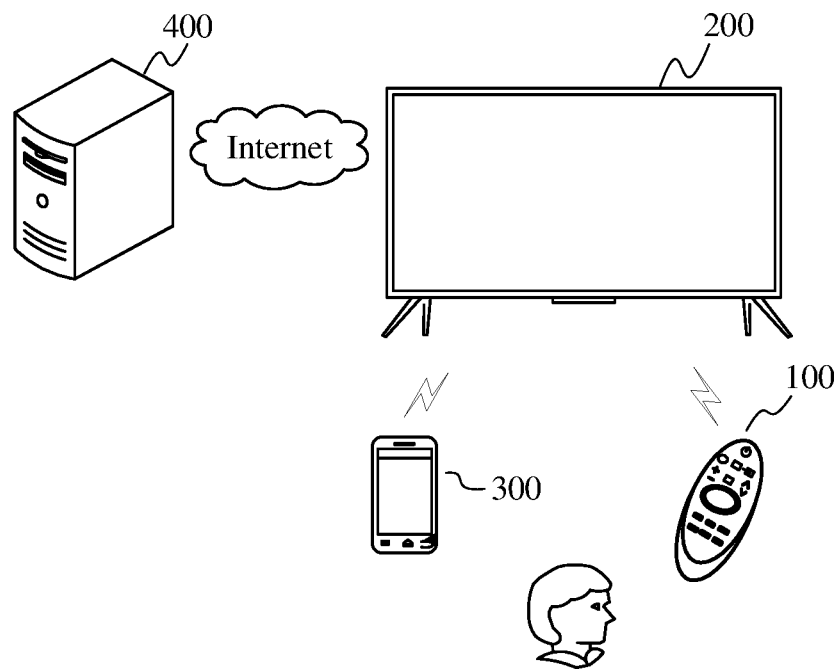
FIG. 1 shows a schematic diagram of an operation scenario between a display apparatus 200 and a control device according to some embodiments.

As shown in FIG. 1, a user can operate a display apparatus 200 through a control device 100 or a smart terminal 300. The control device 100 can be a remote control, and can communicate with the display apparatus 200 through infrared protocol communication, Bluetooth protocol communication, or other short-distance communication methods, to control the display apparatus 200 through wireless or other wired methods. A user can input user commands through keys, voice input and control panel input on the remote control, to control the display apparatus 200. In some embodiments, the smart terminal 300, such as a mobile terminal, a tablet computer, a computer, a laptop computer, etc., may be used to control the display apparatus 200 via, for example, an application running on the smart terminal.

Figure 2:
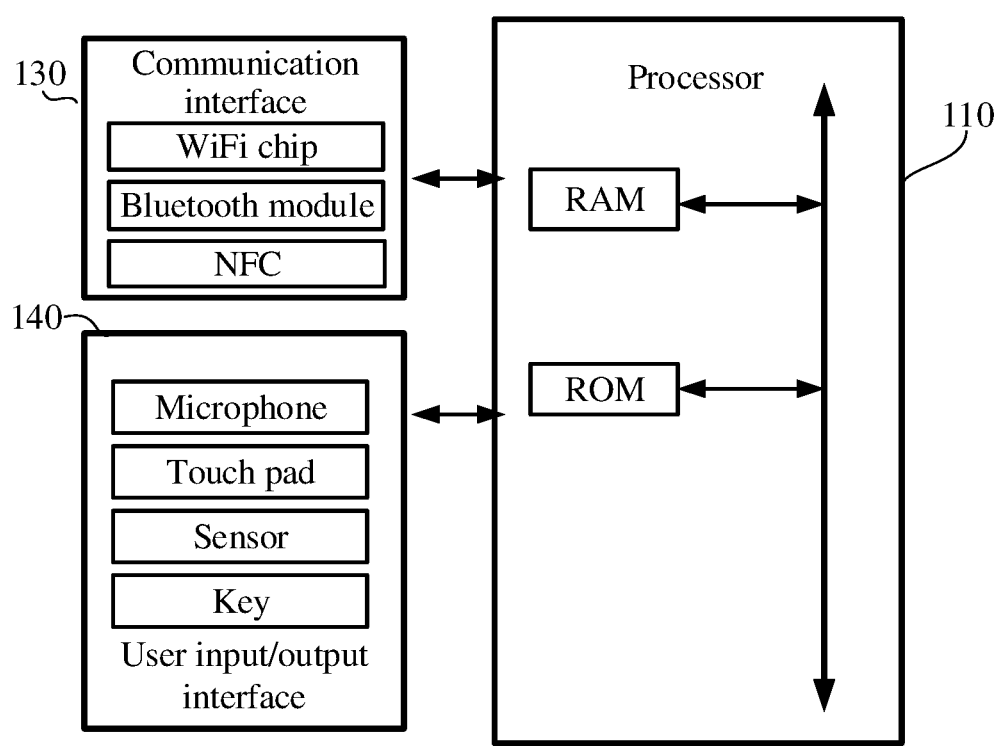
FIG. 2 shows a block diagram of a hardware configuration of the control device according to some embodiments.

In some embodiments, software applications may be installed in the mobile terminal 300 and the display apparatus 200, and used for implementing the connection and communication between the mobile terminal 300 and the display apparatus 200 through the network communication protocols. The audio and video content displayed on the mobile terminal 300 may be transmitted to the display apparatus 200 to realize the synchronous display. The display apparatus 200 also communicates data with the server 400 in various communication manners. The server 400 may provide various contents and interactions to the display apparatus 200. In addition to the broadcast receiving television function, the display apparatus 200 may additionally provide the smart network TV function. As shown in FIG. 2, the control device 100 includes at least one processor 110, at least one communication interface 130, at least one user input/output interface 140, at least one memory, a power supply, etc. The control device 100 may receive a command from a user and convert the command into an instruction that can be recognized and responded by the display apparatus 200. The communication interface 130 is used for communication with outside, and the user input/output interface 140 includes at least one of microphone, touchpad, sensor, button or alternative module.

Figure 3:
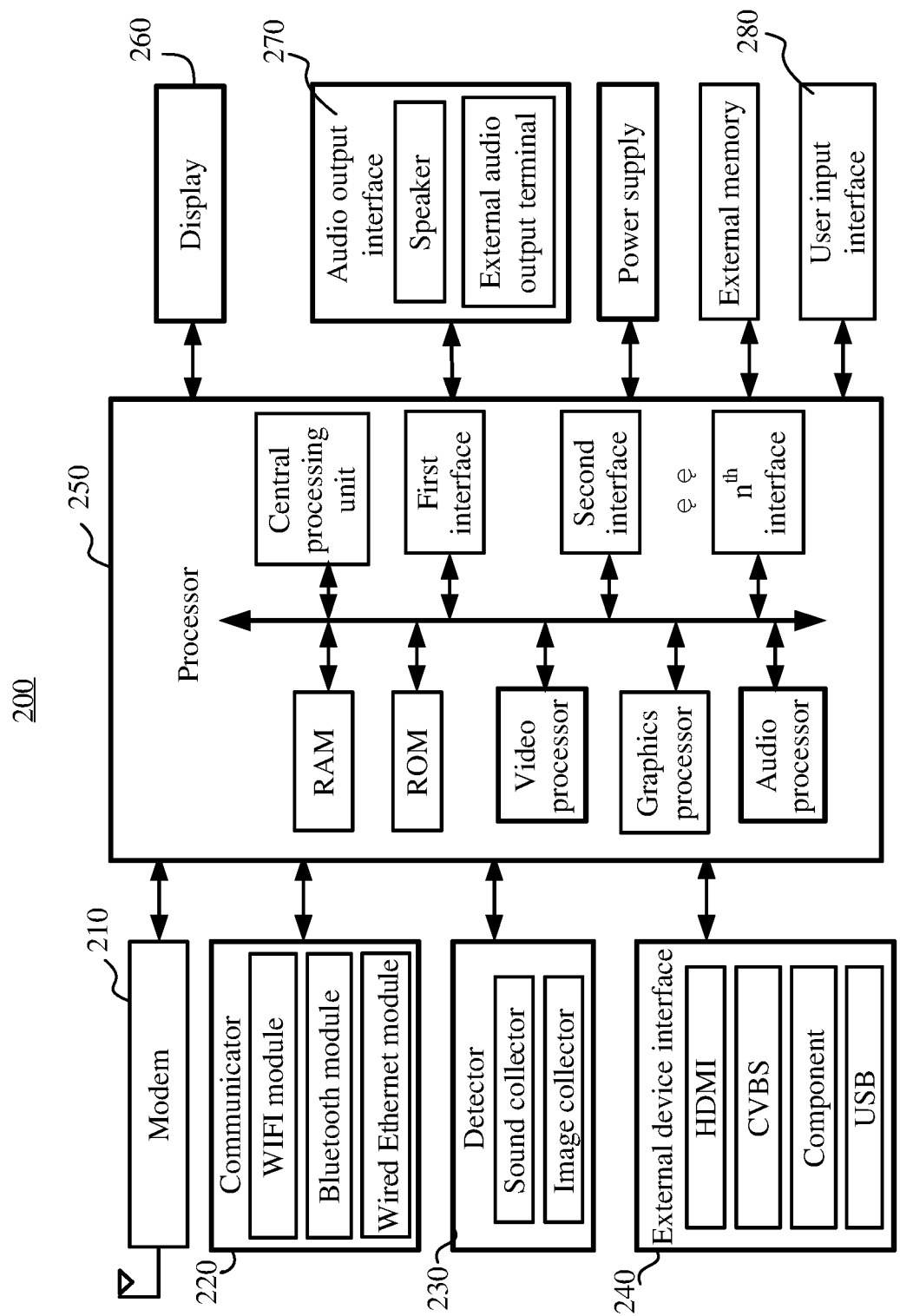
FIG. 3 shows a block diagram of a hardware configuration of the display apparatus according to some embodiments.

As shown in FIG. 3, the display apparatus 200 includes at least one of a modem 210, a communicator 220, a detector 230, an external device interface 240, at least one processor 250, a display 260, an audio output interface 270, an external memory, a power supply, and at least one user input interface 280.

The at least one processor includes a central processing unit, a video processor, an audio processor, a graphics processor, an RAM, an ROM, interfaces for input/output, etc. The display 260 may be at least one of a liquid crystal display, an OLED display, a touch display and a projection display.

The modem 210 receives the broadcast television signals in a wired or wireless receiving method, and obtains audio and video signals by demodulation from a plurality of wireless or wired broadcast television signals.

The detector 230 is configured to collect the external environment or the signal for interaction with outside.

In some embodiments, the at least one processor control the operations of the display apparatus and respond to the user's operations through various software programs stored in the memory.

The user may input a command on the Graphical User Interface (GUI) on the display 260, and the user input interface receives the command through the GUI.

Figure 4:
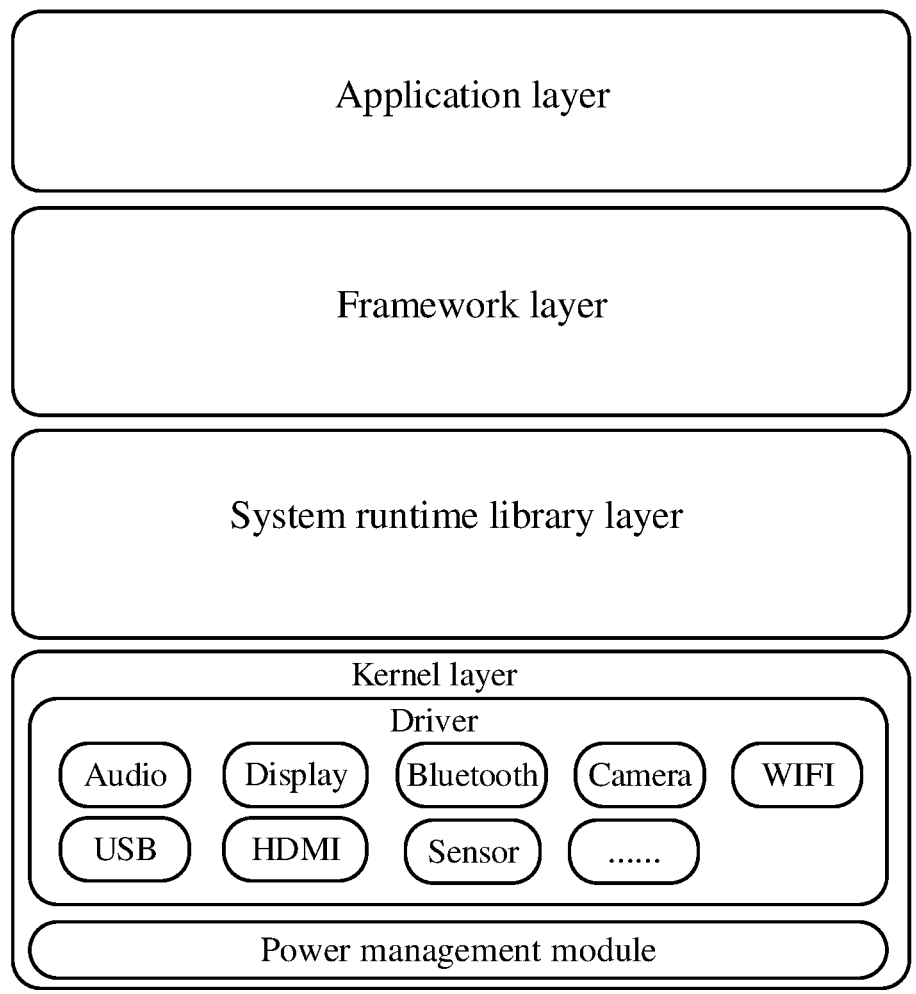
FIG. 4 shows a schematic diagram of a software configuration of the display apparatus according to some embodiments.

As shown in FIG. 4, in some embodiments, the system is divided into four layers, which are, from top to bottom, an applications layer (referred to as "application layer" for short), an application framework layer (referred to as "framework layer" for short), an Android runtime and system library layer (referred to as "system runtime library layer" for short), and a kernel layer. The kernel layer at least includes at least one of: audio driver, display driver, Bluetooth driver, camera driver, WIFI driver, USB driver, HDMI driver, sensor driver (such as fingerprint sensor, temperature sensor, pressure sensor, etc.), and power driver, etc.

Embodiments involving analog dimming and digital dimming will be described below.

The display apparatus is connected with a game device. When a user uses the game device, the game device can output the video data and audio data in real time for the game process, and send the video data and audio data to the display apparatus, so as to output the video data and audio data as the image and sound of the video via the display apparatus. In this case, the game device acts as the sending end, and the display apparatus acts as the receiving end. Since most of the film sources from the game device are based on VRR technology, this imposes many challenges to the processing capability of the display apparatus. Since the game optimization is insufficient or the hardware configuration of the device does not meet the requirements, some parts in the (game) picture generation process are slowed down, and thus the phenomenon such as screen stuttering occurs due to a misalignment or mismatch between the time point of the GPU output and the refresh time of the screen.

Figure 5:
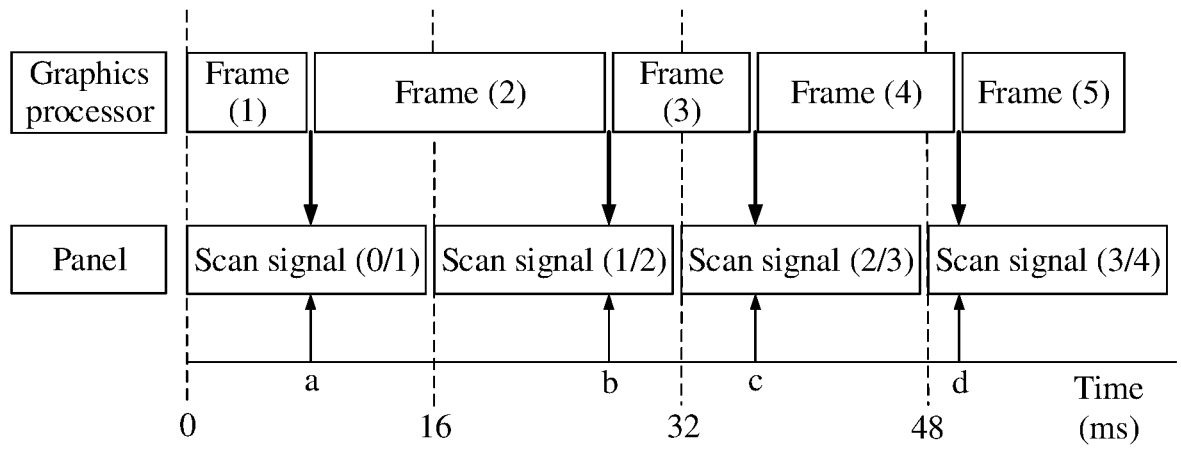
FIG. 5 shows a schematic diagram of screen tearing according to some embodiments.

In some embodiments, as shown in FIG. 5 which shows a schematic diagram of screen tearing, the refresh frequency of the panel of the display is fixed. During the period of the first scan signal (Scan (0/1)) of the panel, the first frame (Frame (1)) of the Graphics Processing Unit (GPU) is displayed on the panel. When the Frame (1) has not completely disappeared, the second frame (Frame (2)) is output to the panel for display. In this case, the first scan signal (Scan (0/1)) corresponds to the Frame (1) and Frame (2), and at this point a the two frames are displayed simultaneously. However, the point a is before the first refresh point (16 ms) of the panel, thus, the screen tearing occurs at the point a. Similarly, the screen tearing occurs at the points b, c and d.

Figure 6:
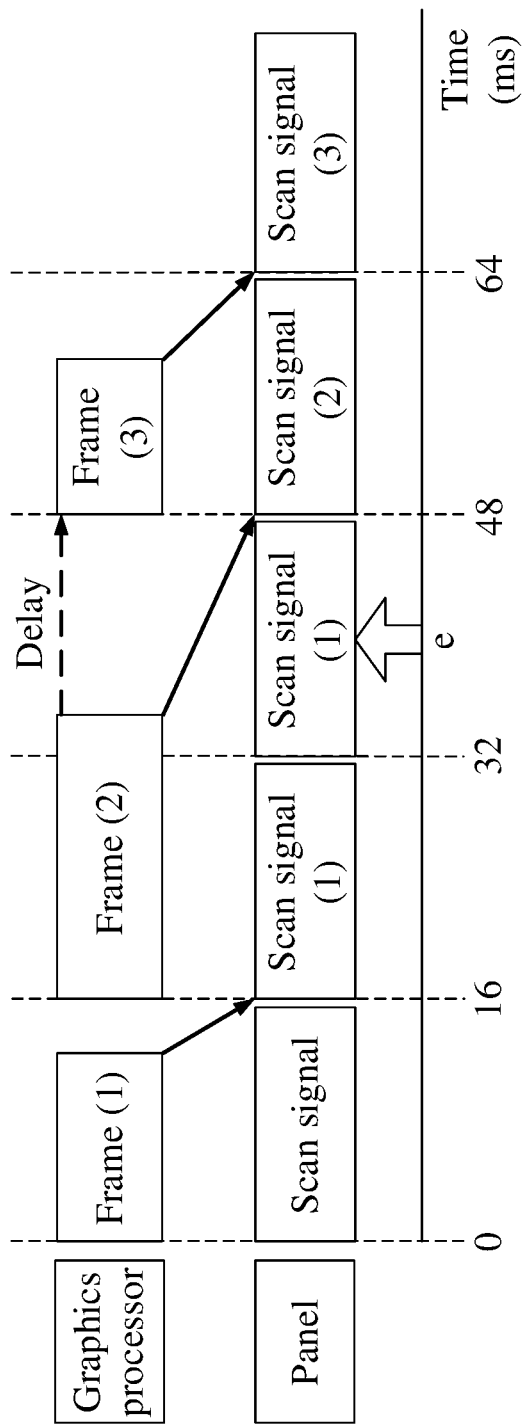
FIG. 6 shows a schematic diagram of screen stuttering according to some embodiments.

In some embodiments, as shown in FIG. 6 which shows a schematic diagram of picture stuttering, the refresh frequency of the panel of the screen is fixed. During the period of the first scan signal (Scan), the first frame (Frame (1)) from the GPU is displayed on the panel. When the first refresh point of 16 ms arrives, the second scan signal (Scan (1)) corresponds to the second frame (Frame (2)). When the second refresh point of 32 ms arrives, the GPU outputs no new image, and the time misalignment occurs, so that the screen stuttering occurs at the point e. When the third refresh point of 48 ms arrives, the third frame (Frame (3)) output by the GPU is displayed on the panel.

The display apparatus designed for the game scenario uses a display screen in the variable refresh rate mode. Since the refresh rate of the screen can be adjusted in real time, the screen flicker will appear or the Moire phenomenon will occur on the screen in the dark field if there is a phase difference between the refresh rate of the liquid crystal display screen and the backlight frequency of the LED backlight, thereby affecting the display quality of the screen. Some embodiments of the disclosure provide a display apparatus. When the display apparatus is in the VRR mode, the dimming mode of the backlight module can be set as the analog dimming mode. In the analog dimming mode, the display apparatus can adjust the backlight brightness of the backlight module by adjusting the supply voltage/current of the backlight module. Since there is no refresh rate issue in the analog dimming mode, the screen flicker or Moire phenomenon is avoided, thereby ensuring the display quality of the screen and improving the user's viewing experience. Here, the at least one processor is configured to: in response to detecting that the display apparatus enters the VRR mode, set the dimming mode of the backlight module as the analog dimming mode; and adjust the supply voltage/current of the backlight module, according to a target brightness of the display data to be displayed on the display module, in such a way that the backlight brightness of a light source provided by the backlight module is consistent with the target brightness. Specifically, the dimming modes of the backlight module include digital dimming mode and analog dimming mode.

Figure 7:
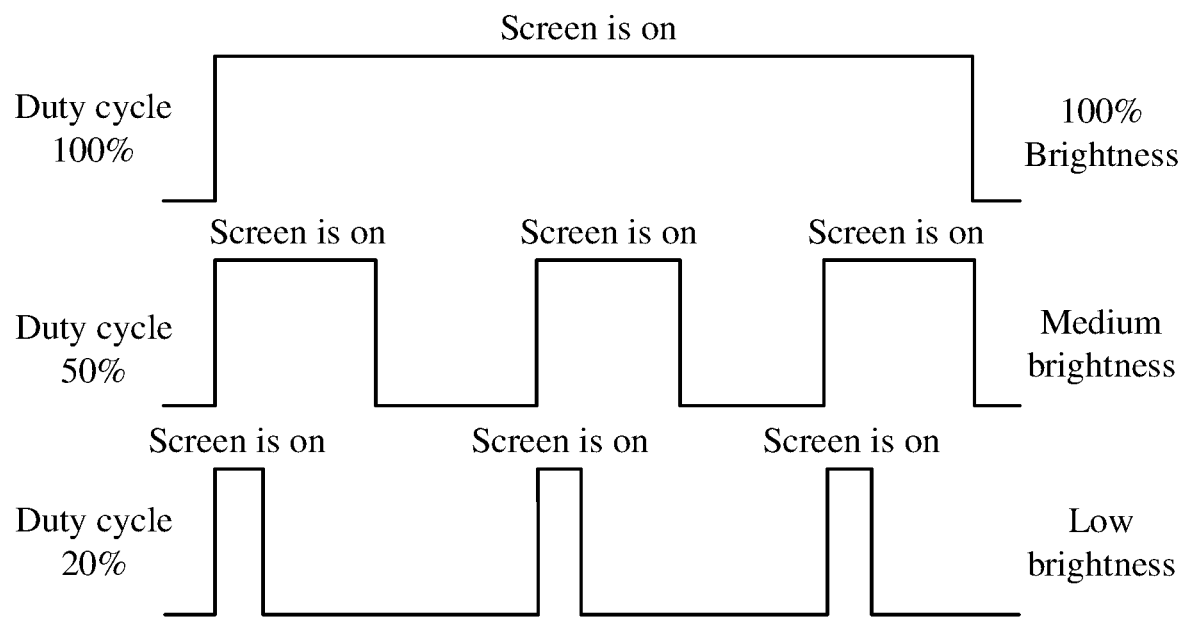
FIG. 7 shows a schematic diagram illustrating the digital dimming principle according to some embodiments.

Here, the digital dimming mode refers to a dimming mode where the LED backlight is adjusted based on the PWM technology. FIG. 7 shows a schematic diagram illustrating the digital dimming principle according to some embodiments. As shown in FIG. 7, while the PWM output is at a high level, the power supply circuit of the backlight is turned on, and the backlight is lit; while the PWM output is at a low level, the power supply circuit of the backlight is turned off, and the backlight goes out. In this example, the PWM output with a duty cycle of 100% is used to control the backlight to output a brightness of 100%, the PWM output with a duty cycle of 50% is used to control the backlight to output a medium brightness, and the PWM output with a duty cycle of 20% is used to control the backlight to output a low brightness.

Figure 8:
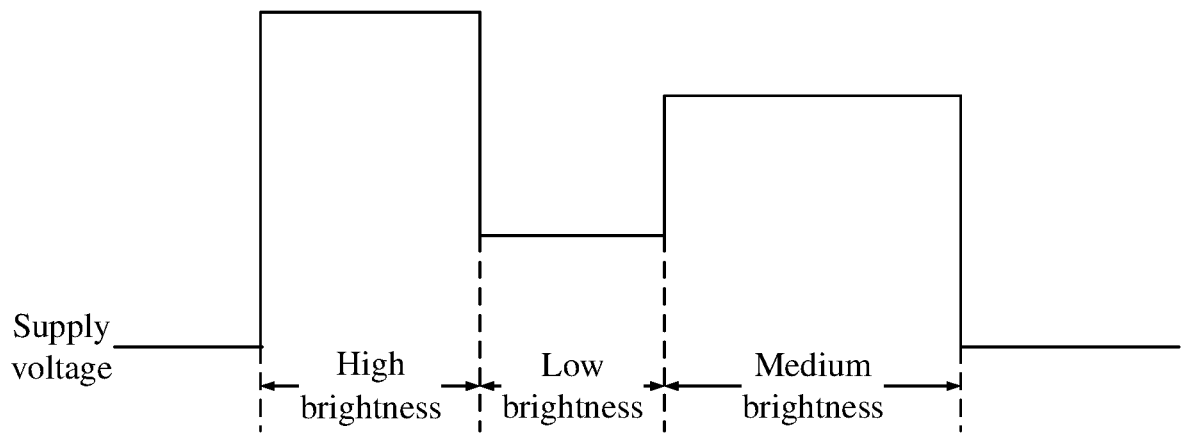
FIG. 8 shows a schematic diagram illustrating the analog dimming principle according to some embodiments.

In the analog dimming mode, the power supply circuit of the backlight is maintained in on state, and the brightness of the backlight is adjusted by adjusting the supply voltage/current. FIG. 8 shows a schematic diagram illustrating the analog dimming principle according to some embodiments. As shown in FIG. 8, when the supply voltage/current is high, the backlight can be set to a high brightness; when the supply voltage/current is medium, the backlight can be set to a medium brightness; when the supply voltage/current is low, the backlight can be set to the low brightness.

The digital dimming mode and the analog dimming mode have different dimming principles. In the digital dimming mode, the backlight of the screen is always changing due to the refresh cycle of the PWM signal. Although this change is beyond the perceptible range of the human eye, prolonged exposure to the screen can still cause visual fatigue. In this case, since there is also a refresh cycle for the display image, the screen flicker or the Moire phenomenon will appear when there is a phase difference between the refresh rate of the screen and the refresh rate of the PWM, affecting the display effect. In addition, the power supply circuit of the backlight is frequently turned on and off under the control of the PWM signal, and some of the electrical energy is consumed in switching components on and off, thereby reducing the photoelectric conversion efficiency and leading to a poor efficiency index for the display apparatus. In the analog dimming mode, since there is no refresh cycle, the visual fatigue and the Moire phenomenon will not occur, and the photoelectric conversion efficiency is also high.

Based on the above, when the at least one processor detects that the display apparatus enters the VRR mode, the refresh rate of the screen will change along with the output frequency of the GPU in the VRR mode. In this case, if the current dimming mode of the backlight module is digital dimming mode, there may be a phase difference between the refresh rate of the screen and the backlight frequency of the LED backlight, thereby leading to the screen flicker or the Moire phenomenon on the screen in the dark field.

In some embodiments, the adjustment of the dimming mode by the at least one processor can be implemented in the following two cases according to needs: (1) if the dimming mode of the backlight module is the digital dimming mode when the display apparatus enters the VRR mode, switching the dimming mode from the digital dimming mode to the analog dimming mode; (2) if the dimming mode of the backlight module is the analog dimming mode when the display apparatus enters the VRR mode, maintaining the analog dimming mode. After the at least one processor adjusts the dimming mode of the backlight module to the analog dimming mode, if the display apparatus obtains the display data to be displayed at this time, the at least one processor can adjust the supply voltage/current of the backlight module according to the target brightness of the display data to be displayed on the display module, in such a way that the backlight brightness of the light source provided by the backlight module is consistent with the target brightness, so as to ensure that the display module can display the picture corresponding to the display data according to the target brightness.

In some embodiments, the at least one processor is configured to: determine whether the display apparatus enables a local dimming function; in response to the local dimming function being enabled, determine whether the display apparatus supports analog local dimming; and in response to the display apparatus supporting the analog local dimming, adjust the supply voltage/current of the backlight module corresponding to each partition according to the target brightness of the display data to be displayed in different partitions on the display module. Specifically, for the display apparatus with the local dimming function, the panel can be divided into a plurality of partitions, for example, the entire screen is divided into M*N partitions, etc., and then the dimming processing is performed on each partition, that is, the backlight brightness of the backlight module corresponding to each partition is adjusted respectively.

After the at least one processor determines that the display apparatus has enabled the local dimming function, the display apparatus currently supports the dimming of different partitions of the screen. The at least one processor further determines whether the display apparatus supports the dimming of different partitions in the analog dimming mode. In response to the display apparatus supporting the analog local dimming, the at least one processor adjusts the supply voltage/current of the backlight module corresponding to each partition, according to the target brightness of the display data to be displayed in different partitions on the display module, in such a way that the display brightness of different partitions of the screen is different, so as to realize the analog dimming processing of each partition. In the embodiments, on the one hand, the brightness can be adjusted according to the brightness requirements of different partitions through the local dimming in such a way that the bright areas in a screen image are brighter and the dark areas in the screen image are darker, which can optimize the image contrast; and on the other hand, the analog local dimming can also avoid the phenomenon of screen flicker or Moire, so as to ensure the display quality of the screen and improve the user's viewing experience.

In some embodiments, the at least one processor is configured to: determine a color temperature correction amount corresponding to each partition according to the supply voltage/current of the backlight module corresponding to each partition, and perform color temperature correction for each partition based on the color temperature correction amount. When performing the local dimming via in analog mode, since the supply voltages/currents of different partitions need to be adjusted, the color temperature of the LED will also change with the change of the supply voltage/current. Taking a power-type white LED as an example, a corresponding color temperature varies as the supply current varies within the working range. When the supply current increases, the amount of the blue light emitted by the LED increases. However, the thickness of the phosphor layer is constant, so the blue light component in the emitted white light increases, resulting in an increase in color temperature. For example, when the supply current is 100 mA, the color temperature of the power-type white LED is 5636 K; and when the supply current increases to 350 mA, the color temperature of the power-type white LED increases to 5734 K.

In some embodiments, the change in color temperature will further lead to the color cast phenomenon on the screen, for example, the cool color has a bluish bias, the warm color has a yellowish bias, etc., so correction for local color temperature offset is also needed to realize the white balance when performing the local dimming in the analog mode. For example, when determining that the correction for color temperature offset is required, the at least one processor firstly determines the amount of color temperature correction corresponding to each partition according to the supply voltage/current of the backlight module corresponding to each partition, and performs the color temperature correction of each partition based on the amount of color temperature correction corresponding to each partition after obtaining the amount of color temperature correction. Table 1 below is an example of a color temperature correction for the analog dimming

TABLE 1

| Supply current | 100 mA | 150 mA | 200 mA | 250 mA | 300 mA | 350 mA |
| --- | --- | --- | --- | --- | --- | --- |
| Red | 0 | 0 | 0 | 0 | 0 | 0 |
| Green | 0 | 0 | 0 | 0 | 0 | 0 |
| Blue | 0 | −4 | −5 | −6 | −8 | −10 |

Figure 9:
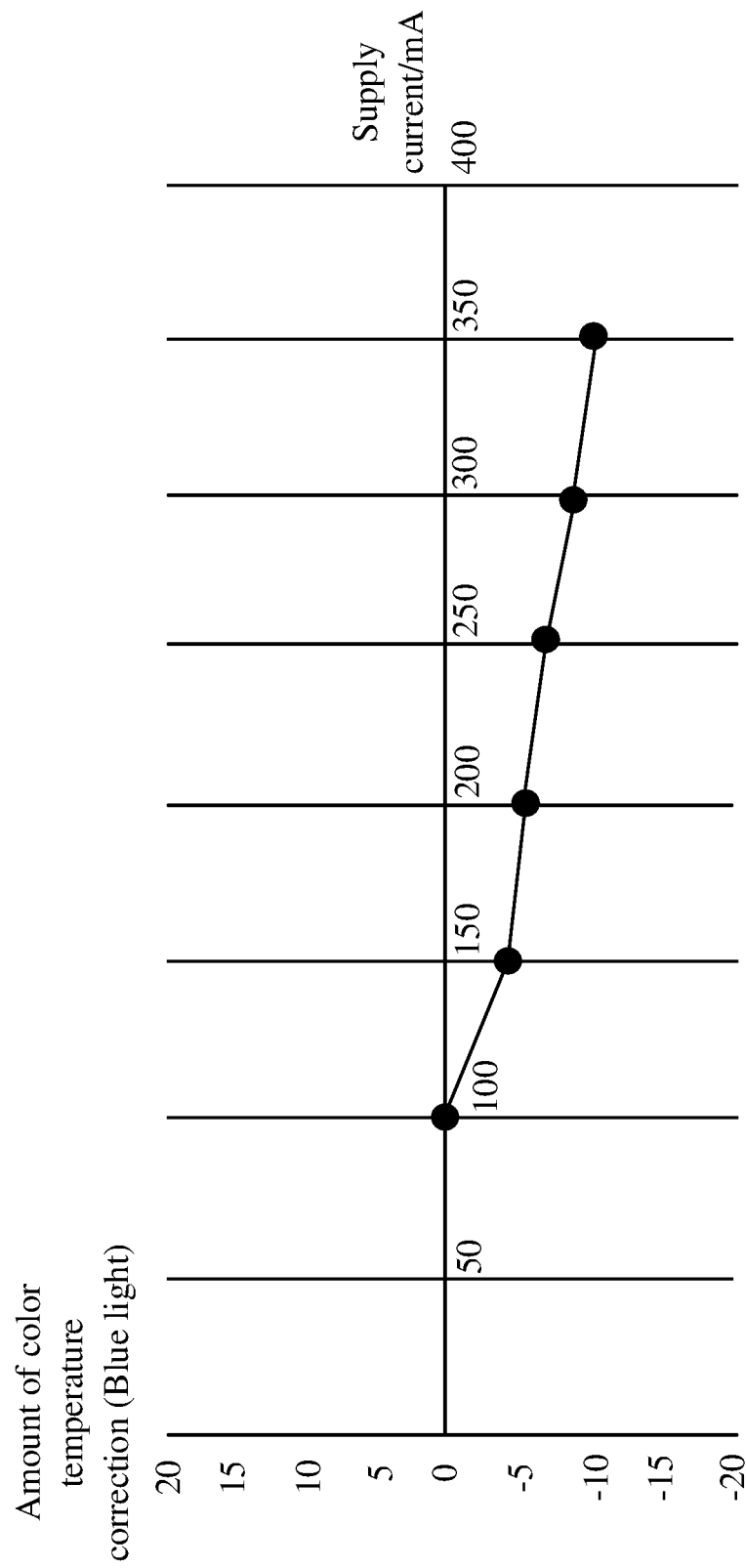
FIG. 9 shows a schematic diagram of a fitting curve for color temperature correction processing according to some embodiments.

FIG. 9 shows a schematic diagram of a fitting curve of color temperature correction processing according to some embodiments. As shown in the above table and FIG. 9, the larger the supply current is, the more the blue component in the white light emitted by the LED. Therefore, the color temperature correction may be performed on the blue light according to the magnitude of the supply current, to realize the white balance and improve the display quality.

In some embodiments, the at least one processor is configured to: increase a target brightness corresponding to first display data in each partition, and decrease a target brightness corresponding to second display data in each partition. When performing the local dimming in the analog mode, the contrast of the display image can be adjusted to further improve the display quality. For example, the first display data has a grayscale value greater than or equal to a preset threshold, that is, the display data with middle and high grayscales (where the middle and high grayscales can be further classified according to another larger preset threshold); and the second display data has a grayscale value less than the preset threshold, that is, the display data with low grayscale.

For the display data with different grayscales, the brightness of the display data with low grayscale (that is, the second display data described above) can be appropriately reduced, and the brightness of the display data with middle and high grayscales (that is, the first display data described above) can be appropriately increased, thereby improving the contrast of the display image. Table 2 below is an example of adjusting the contrast by adjusting the display brightness.

TABLE 2

| Grayscale value | Grayscale level | Initial display brightness | Adjusted display brightness |
|---|---|---|---|
| X1 | Low grayscale | L0_x1 | L1_x1 (L0_x1 > L1_x1) |
| X2 | Middle grayscale | L0_x2 | L1_x2 (L0_x1 < L1_x1) |
| X3 | High grayscale | L0_x3 | L1_x3 (L0_x1 < L1_x1) |

In some embodiments of the disclosure, for the display data with different grayscales in each partition, the contrast of the display image can be improved by adjusting the brightness respectively, thereby further improving the display quality.

In some embodiments, the at least one processor is configured to: in response to the local dimming function being not enabled, determine an amount of color temperature correction according to the supply voltage/current of the backlight module, and perform color temperature correction based on the amount of color temperature correction. If the at least one processor determines that the local dimming function is not enabled, for example, the display apparatus is not configured with the local dimming function, or the display apparatus is configured with the local dimming function but not enable this function currently, then the at least one processor may further perform the global color temperature correction in the analog dimming process of the entire region of the screen. Specifically, the at least one processor may determine the amount of color temperature correction corresponding to the whole display image according to the supply voltage/current of the backlight module, and perform the color temperature correction of the whole image based on the amount of color temperature correction. In some embodiments of the disclosure, when the local dimming function is not enabled, the display quality of the whole display image can be improved by performing the global color temperature correction.

In some embodiments, the at least one processor is configured to: in response to the display apparatus not supporting the analog local dimming, adjust the supply voltage/current of the backlight module according to the target brightness of the display data to be displayed on the display module; where the backlight module corresponding to each partition has the same supply voltage/current. If the at least one processor determines that the display apparatus has enabled the local dimming function but does not support the analog local dimming, it means that the at least one processor cannot perform the dimming of each partition in the analog dimming mode. In this case, the display brightness of each partition can be fixed, that is, the display brightness of each partition is the same. For example, since the display apparatus does not support the analog local dimming, in order to avoid screen flicker or Moire phenomenon due to the phase difference, the global and overall synchronous dimming via analog dimming can be performed, that is, the supply voltage/current of the backlight module can be adjusted according to the target brightness of the display data to be displayed on the display module. The backlight module corresponding to each partition has the same supply voltage/current, so that the display brightness of each partition is also the same. In some embodiments of the disclosure, for the case where the display apparatus has enabled the local dimming function but does not support analog local dimming, the global and overall synchronous dimming can be performed by means of analog dimming, so as to avoid the screen flicker or Moire phenomenon due to the phase difference, and improve the display quality.

In some embodiments, the at least one processor is configured to: control the display apparatus to disable the local dimming function and an image compensation function corresponding to the local dimming function. If the at least one processor determines that the display apparatus has enabled the local dimming function but does not support analog local dimming, it means that the local dimming mode of the display apparatus is digital dimming mode, that is, the brightness is adjusted by adjusting the duty cycle of the PWM signal. In this case, when the analog dimming is performed, the dimming process may be interfered by the vertical synchronization (Vsync) signal in the Serial Peripheral Interface (SPI) data, causing the thin Moire in a large solid color region. Therefore, in order to avoid the signal interference, the at least one processor can control the display apparatus to disable the local dimming function.

Further, in order to reduce the impact of the local dimming on the display quality, the display apparatus also enables the image compensation function corresponding to the local dimming function when enabling the local dimming function. Therefore, after the local dimming function is disabled, the image compensation function corresponding to the local dimming function also needs to be disabled, so as to avoid the influence of the image compensation function on the display image. In some embodiments of the disclosure, for the case where the display apparatus has enabled the local dimming function but does not support analog local dimming, the local dimming function and the image compensation function corresponding to the local dimming function can be disabled, so as to avoid the signal interference caused by local dimming to analog dimming, and improve the display quality.

In some embodiments, the at least one processor is configured to: determine an amount of color temperature correction according to the supply voltage/current of the backlight module, and perform color temperature correction based on the amount of color temperature correction. For the case where the display apparatus has enabled the local dimming function but does not support analog local dimming, after the local dimming function and the image compensation function corresponding to the local dimming function are disabled, the amount of color temperature correction corresponding to the whole display image can also be determined according to the overall supply voltage/current of the backlight module, and the color temperature correction of the whole image is performed based on the amount of color temperature correction. In some embodiments of the disclosure, after the local dimming function and the image compensation function corresponding to the local dimming function are disabled, the display quality of the overall display image can be improved by performing the global color temperature correction.

In some embodiments, the disclosure provides a method for driving backlight module, which mainly includes the following steps.

S100, in response to detecting that the display apparatus enters the VRR mode, adjusting the dimming mode of the backlight module to the analog dimming mode.

S200, adjusting the supply voltage/current of the backlight module, according to the target brightness of the display data to be displayed on the display module, in such a way that the backlight brightness of a light source provided by the backlight module is consistent or matches with the target brightness.

In some embodiments, the method further includes:
S310, determining whether the display apparatus enables a local dimming function;
S320, determining whether the display apparatus supports analog local dimming in response to the local dimming function being enabled; and
S321, in response to the display apparatus supporting the analog local dimming, adjusting the supply voltage/current of the backlight module corresponding to each partition according to the target brightness of the display data to be displayed in different partitions on the display module.

In some embodiments, the method further includes:
S322, determining an amount of color temperature correction corresponding to each partition according to the supply voltage/current of the backlight module corresponding to each partition, and performing color temperature correction for each partition based on the amount of color temperature correction.

In some embodiments, the method further includes:
S323, increasing the target brightness corresponding to the first display data in each partition, and decreasing the target brightness corresponding to the second display data in each partition.

In some embodiments, the method further includes:
S330, in response to the local dimming function being not enabled, determining an amount of color temperature correction according to the supply voltage/current of the backlight module, and performing color temperature correction based on the amount of color temperature correction.

In some embodiments, the method further includes:
S324, in response to the display apparatus not supporting the analog local dimming, adjusting the supply voltage/current of the backlight module according to the target brightness of the display data to be displayed on the display module, where the backlight module corresponding to each partition has the same supply voltage/current.

In some embodiments, the method further includes:
S325, controlling the display apparatus to disable the local dimming function and an image compensation function corresponding to the local dimming function.

In some embodiments, the method further includes:
S326, determining an amount of color temperature correction according to the supply voltage/current of the backlight module, and performing color temperature correction based on the amount of color temperature correction.

Embodiments where EDID is compatible with HDMI version will be described below.

The display apparatus can be connected with the game device via a HDMI port. When the user uses the game device, the game device can output the video data and audio data by running a game-related application. The video data and audio data can be sent to the display apparatus based on a HDMI protocol, and output to the screen and speaker of the display apparatus to play the video and audio of the game device. After the external device is connected with the display apparatus, the external device can transmit data based on a specific standard or protocol, so that the display apparatus and the external device can have mutual identification and establish a data transmission channel. For example, the display apparatus may establish a connection with the external device based on Extended Display Identification Data (EDID), and realize the mutual identification.

Figure 10:
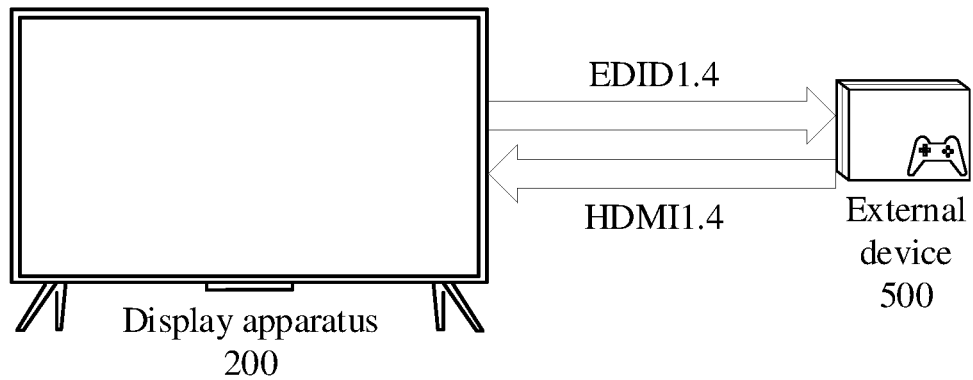
FIG. 10 shows a schematic diagram illustrating the compatibility between display apparatus and an external device according to some embodiments.

After the external device is connected with the display apparatus, the external device can transmit data based on a specific standard, so that the display apparatus and the external device can establish mutual identification and establish a data transmission channel. For example, the display apparatus can be identified by the external device based on the EDID. In order to establish connection with different external devices, the display apparatus needs to enable its EDID version for different external devices. For example, as shown in FIG. 10 which is a schematic diagram illustrating the compatibility between the display apparatus and the external device, the display apparatus can enable the EDID version for the HDMI1.4 and HDMI2 versions, so that the external device can perform the data transmission based on the same transmission protocol version after connecting with the display apparatus. That is, when the display apparatus is connected with an external device that only supports the HDMI1.4 version, the display apparatus needs to set the EDID version as HDMI1.4, such that the display apparatus is compatible with the external device. When the HDMI version number supported by the display apparatus does not match with that supported by the external device, the incompatibility between the display apparatus and the external device may occur. For example, the EDID version number of the display apparatus is selected as 2.0, while a DVD that only supports the version 1.4 is connected, then the DVD may not identify the EDID of the display apparatus. In this case, when the DVD sends a DVI signal, it may have no sound problem.

The display apparatus and the external device need to use the same transmission protocol version to identify each other and realize the predetermined data transmission. The display apparatus can detect the transmission protocol version supported by the external device, and automatically adapt to the appropriate mode. In order to alleviate a problem of incompatibility between the display apparatus and the external device, the display apparatus can have a built-in EDID dynamic adjustment (auto EDID) algorithm for automatically enabling the HDMI version supported by the external device. That is, if the display apparatus adopts the auto EDID algorithm, the EDID will be dynamically adjusted, so that the display apparatus can freely switch between versions EDID1.4 and EDID2.0. Different forms of EDID dynamic adjustment algorithms may be built in the display apparatus, so that the display apparatus can dynamically switch for various external devices. However, due to the update of the transmission protocol version, the automatic switching algorithm adopted by the display apparatus will not be able to accurately identify some devices using the new version of transmission protocol after the new version of transmission protocol is used. For example, with the formulation of the version HDMI2.1, more and more external devices can support the HDMI2.1 protocol. However, no HDMI2.1-related EDID enabling program is involved in the previous auto EDID algorithm, so the incompatibility problem inevitably occurs when the display apparatus still uses the previous auto EDID algorithm, affecting the data transmission between devices.

In some embodiments, the EDID version 2.0 is preconfigured. If an external device of version HDMI2.1 is connected, the external device also supports version HDMI2.0 due to the backward compatibility. In this case, the display apparatus may detect the bit rate of the Transition Minimized Differential Signaling (TMDS) in the Status and Control Data Channel (SCDC) through the Display Data Channel (DDC) pin, and will not dynamically enable the version EDID2.1 based on the auto EDID algorithm, so that the external device reads the EDID version 2.0 and mistakenly thinks that the current display apparatus does not support the version HDMI2.1, and thus the external device cannot send 8 K signal. If the EDID version 2.1 is preconfigured and an external device that only supports the version HDMI2.0 is connected, the external device will send the TMDS bit rate or write a value in the SCDC, so the EDID will not be dynamically switched to the version 2.0 either. In this case, for the external device that supports the version HDMI2.0, the display apparatus reading the EDID version 2.1 may not identify the EDID version 2.1 either, resulting in the incompatibility issues.

In order to improve the compatibility between the display apparatus and the external device, some embodiments of the disclosure provide a display apparatus, including: a display 260, an external device interface 240, a memory and at least one processor 250. Here, the display 260 is configured to display an image and/or a user interface which may include a media resource image sent from an external device. The external device interface 240 is used for connecting with an external device, and may be in the form of a HDMI port or the like. The memory is configured to store instructions and data associated with the display. The at least one processor 250 may be configured to execute a method for automatically switching transmission protocols, and may automatically identify the transmission protocol versions supported by different external devices when the external devices are connected, and adopts the identification information of the corresponding version, so that the external devices can identify the display apparatus.

Figure 11:
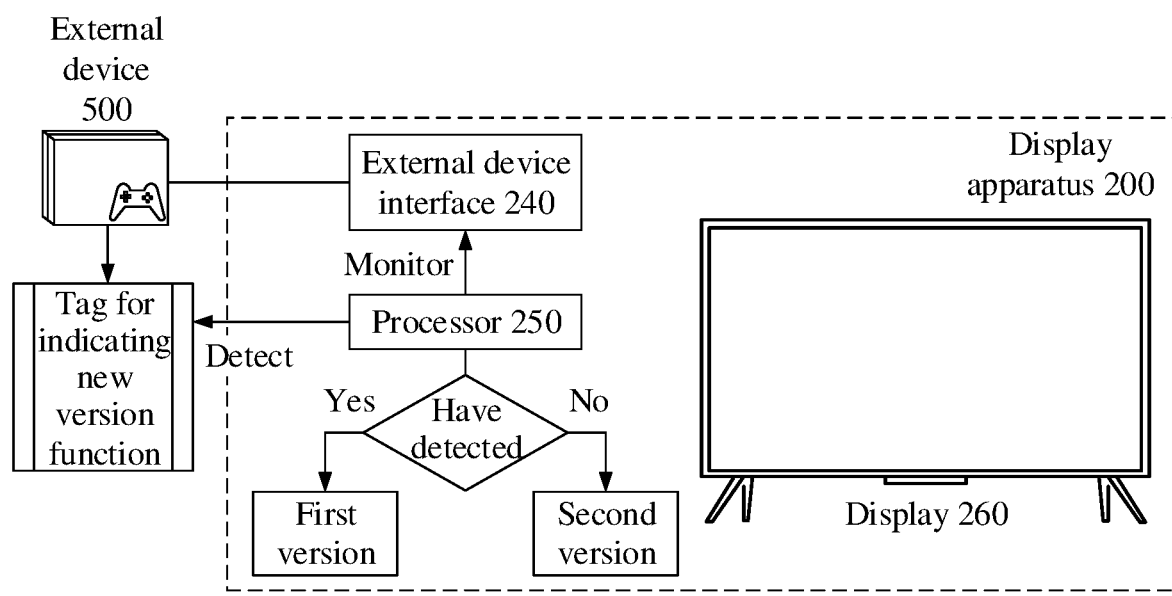
FIG. 11 shows a schematic flowchart of a method for automatically switching transmission protocols according to some embodiments.

In some embodiments, FIG. 11 is a schematic flowchart of a method for automatically switching transmission protocols according to some embodiments. As shown in FIG. 11, the at least one processor is configured to, in response to detecting that an external device is connected via the external device interface 240, detect a configuration process of a new version function initiated by the external device, where the new version function is an additional transmission function of a first version of transmission protocol with respect to a prior second version of transmission protocol.

When the external device is connected via the external device interface 240, there will be a voltage change at the external device interface 240, so the display apparatus can determine whether an external device is connected by monitoring the voltage change at the external device interface 240. For example, the display apparatus may start a signal detection thread for HDMI to detect the voltage change. When an external device is connected, the display apparatus can detect the voltage of 5V provided by the external device, thereby determining that the external device is connected. When detecting that the external device is connected with the display apparatus, the display apparatus can detect the transmission protocol version supported by the external device, so that the external device can identify the display apparatus by adjusting the EDID version of the display apparatus, and establish data communication based on the appropriate transmission protocol version.

Embodiments based on a Fixed Rate Link (FRL) mode will be described below.

In some embodiments of the disclosure, the transmission protocols may be indicated by a plurality of version numbers, such as a first version and a second version, according to the version update iteration order. Based on the difference between specific transmission protocols, the transmission protocols may have more versions, such as a third version, a fourth version, etc. A new version usually has new data transmission functions, i.e., additional functions, relative to an old version. The external device performs configuration based on the additional functions of the new version after being connected with the display apparatus, so the display apparatus can determine whether the external device supports the new version of transmission protocol based on whether the external device is successfully configured with the new version function. During configuration of a new version function, the external device can add a tag for indicating the new version function to the transmission data, so the display apparatus can determine whether the new version function is configured successfully by detecting the tag for indicating the new version function.

If the tag for indicating the new version function is detected, the version of the transmission protocol is switched to the first version. Upon detecting a configuration process initiated by the external device, the display apparatus can determine whether the current external device supports the new version of transmission protocol based on whether the external device can provide additional functions of the new version. Therefore, the display apparatus can correspondingly enable the new version of transmission protocol. Similarly, if the tag for indicating the new version function is not detected, it can be determined that the external device cannot provide additional functions of the new version, that is, the external device does not support the new version of transmission protocol, so the transmission protocol needs to be switched to the prior second version. For example, compared to version HDMI2.0, version HDMI2.1 can enable a Fixed Rate Link (FRL) transmission mode, in which the clock signal can be carried in the data signal and then the clock signal can be parsed out through subsequent Clock Recovery processing, so that the HDMI protocol can have one more channel to transmit the video signal, to improve the signal transmission bandwidth. In this case, in the FRL mode, a new physical layer transmission method can be introduced, and the 16b/18b encoding method can be used to further improve the utilization rate of the channel bandwidth, to allow the channel to transmit the image with higher resolution and refresh rate. In the FRL mode, the bandwidth can be increased to 48 Gbps, and the image transmission with a resolution of up to 10 K can be performed by compression.

Based on the additional function of the FRL transmission mode, the external device supporting the HDMI2.1 protocol can firstly initiate a FRL training process to the display apparatus after connecting via the external device interface 240 (i.e., the HDMI port). If the external device does not initiate the FRL training process after connecting via the HDMI interface, it can be directly determined that the external device does not support the new version of transmission protocol, that is, the external device does not support version HDMI2.1. In this case, the EDID of the display apparatus can be switched to version 2.0, so that the external device can be recognized, and a data connection is established based on the HDMI2.0 version.

When the external device initiates the FRL training process to the display apparatus, it can be determined that the current external device may support version HDMI2.1. However, if the determining of transport protocol is performed only based on whether the external device initiates FRL training, the case where the external device initiates FRL training but the FRL training process fails may occur, causing the FRL training process to continue, no signal is transmitted under EDID2.1 version. Therefore, after determining that the external device initiates the FRL training process, the display apparatus can also detect whether the current FRL training process is successfully completed. If the FRL training process is successfully completed, it can be determined that the current external device supports version HDMI2.1, so the display apparatus can be controlled to switch the EDID version to the version 2.1, so as to be compatible with the external device.

In some embodiments, in order to detect whether the FRL training process is successfully completed, the display apparatus can determine whether the lane pattern parameter sent from the external device is consistent with the pattern parameter preset by the display apparatus, and determine whether the FRL training process is successful completed according to the determining result. When the pattern parameter sent from the external device is consistent with the pattern parameter preset by the display apparatus, it is determined that the FRL training process has been successfully completed. As can be seen, in some of the above embodiments, when the external device is connected, the display apparatus can determine whether the external device can realize the additional functions of the new version of transmission protocol by detecting the configuration process of the new version function, so as to automatically switch to an appropriate transmission protocol version according to the detection result, then the display apparatus and the external device can identify each other and establish communication based on the appropriate transmission protocol version, thereby improving the compatibility between the display apparatus and the external device.

Figure 12:
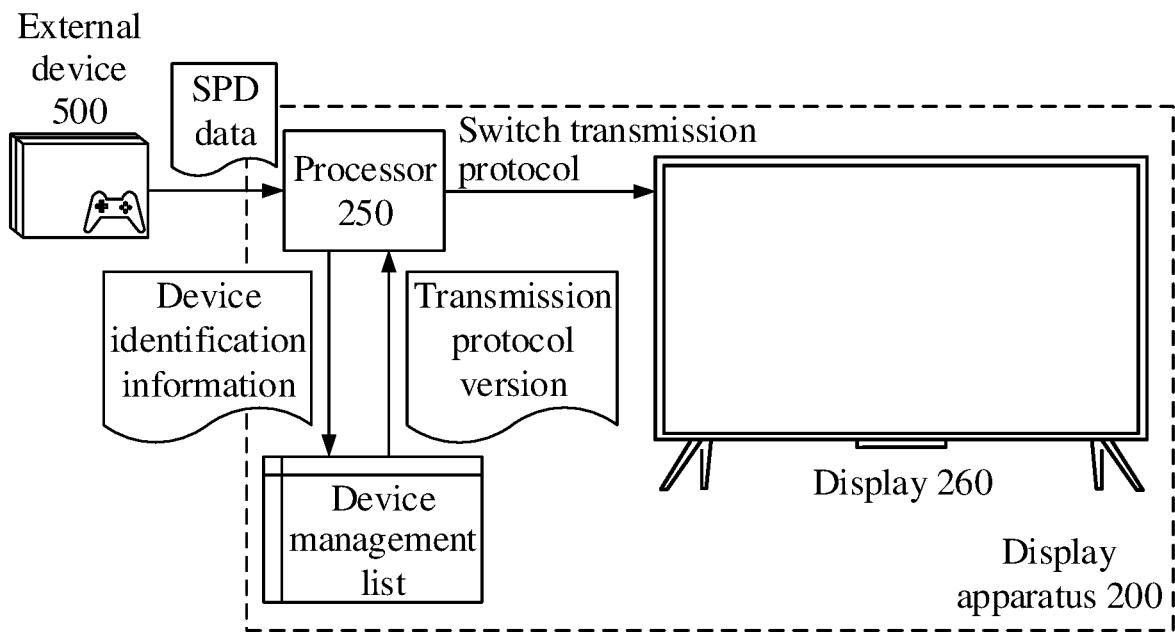
FIG. 12 shows a schematic flowchart of detecting a protocol version of an external device based on a device management list according to some embodiments.

In some embodiments, FIG. 12 is a schematic flowchart of detecting the protocol version of the external device based on a device management list according to some embodiments. As shown in FIG. 12, in order to quickly determine the transmission protocol type supported by the external device, a device management list can also be built in the display apparatus, and the device information of the external device in connection with the display apparatus and the transmission protocol version supported by the external device can be stored in the device management list. Therefore, after detecting that the external device is connected via the external device interface 240 of the display apparatus, the display apparatus may obtain the Source Product Description (SPD) data from the external device, where the SPD data is a data frame for describing the information of the source device itself specified according to the HDMI protocol, and the SPD frame can be generated based on the basic HDMI protocol. The auxiliary information for describing the device information can be sent to the display apparatus without additional configuration of the external device. Since the external device can send the SPD frame according to a preset time interval while transmitting the media resource information data, the display apparatus can obtain the SPD frame sent by the external device when the external device is connected via the HDMI port.

After obtaining the SPD data, the display apparatus may also read the device identification information from the SPD data, where the device identification information can include device type and device model, for example, the device type can be game console, multimedia player, smart terminal, etc., and the model can be indicated as a specific model index according to the iterative order of products with the device type. The new and old degree of the product of the external device can be identified through the model, and the specific protocol version that the product can support is determined based on different models. For example, for a game console of an early model, the new version of the transmission protocol has not been formulated when the game console is launched, so the game console generally does not support the new version of transmission protocol. With the continuous update of products, the game consoles of recent model can support the new version of transmission protocol.

After reading the device identification information of the external device, the display apparatus can perform matching in the stored device management list according to the device identification information to determine whether the content related to the current external device has been recorded in the device management list. If the device identification information is in the device management list, the transmission protocol version supported by the current external device can be determined according to the device management list. Then the version of the transmission protocol is switched to the transmission protocol version stored in the device management list. For example, the device identification information of the external device is obtained by reading the SPD data, for example, the game console model is "Game xx-2020s", and then an item including this game console model may be matched in the device management list stored in the display apparatus according to the device identification information. When the display apparatus finds the item including "Game xx-2020s" in the device management list, the display apparatus can extract the transmission protocol version supported by the current external device from this item. For example, the parameter value of 1 corresponding to the HDMI2.1 version is found, indicating that the external device supports the HDMI2.1 version.

Similarly, if the device identification information is not in the device management list, that is, the information related to the current external device is not recorded in the device management list, the display apparatus can perform the step of detecting the tag for indicating the new version function, that is, detect the transmission protocol version supported by the external device in the manner described in some of the above embodiments. As can be seen, by storing the device management list in the display apparatus, the transmission protocol version supported by the external device can be obtained directly from the device management list when the external device is connected, so as to quickly switch the transmission protocol version.

Figure 13:
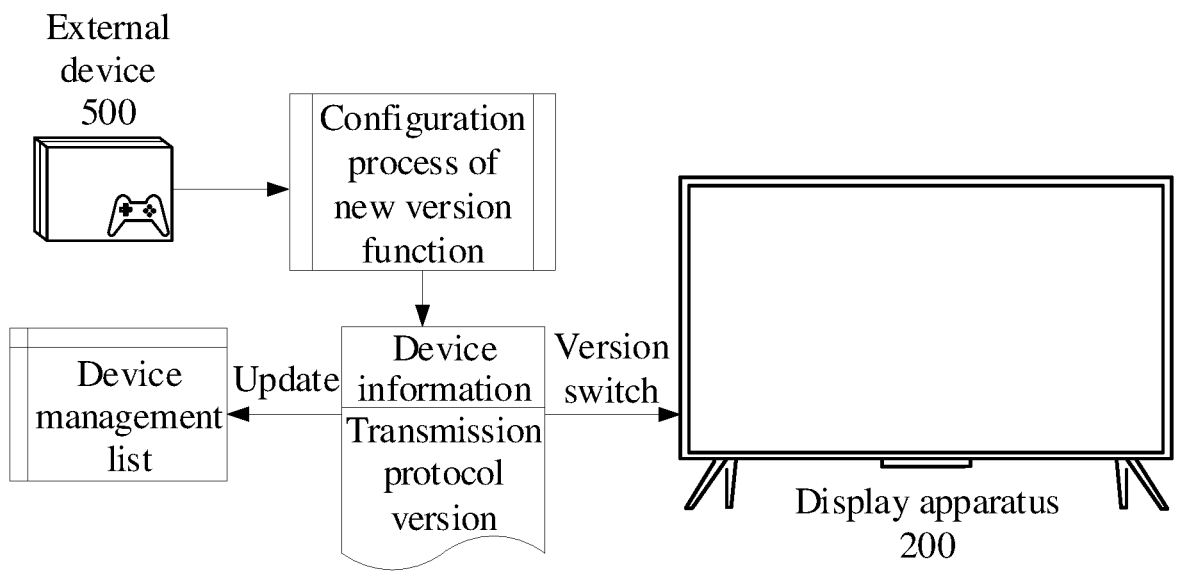
FIG. 13 shows a schematic flowchart of updating the device management list according to some embodiments.

In some embodiments, FIG. 13 is a schematic flowchart of updating the device management list according to some embodiments. As shown in FIG. 13, in order to enable the external device connected with the display apparatus to quickly determine the transmission protocol version supported by the external device in subsequent connection, for the external device not recorded in the device management list, the display apparatus can extract the device information of the external device and the transmission protocol version supported by the external device after changing the version of the transmission protocol, and store the device information and transmission protocol version in the device management list according to the data storage rule for the device management list, to update the device management list. Based on this, when the external device is connected with the display apparatus again, the display apparatus can directly obtain the transmission protocol version supported by the external device based on the updated device management list, so as to improve the subsequent switching speed of the transmission protocol version.

Figure 14:
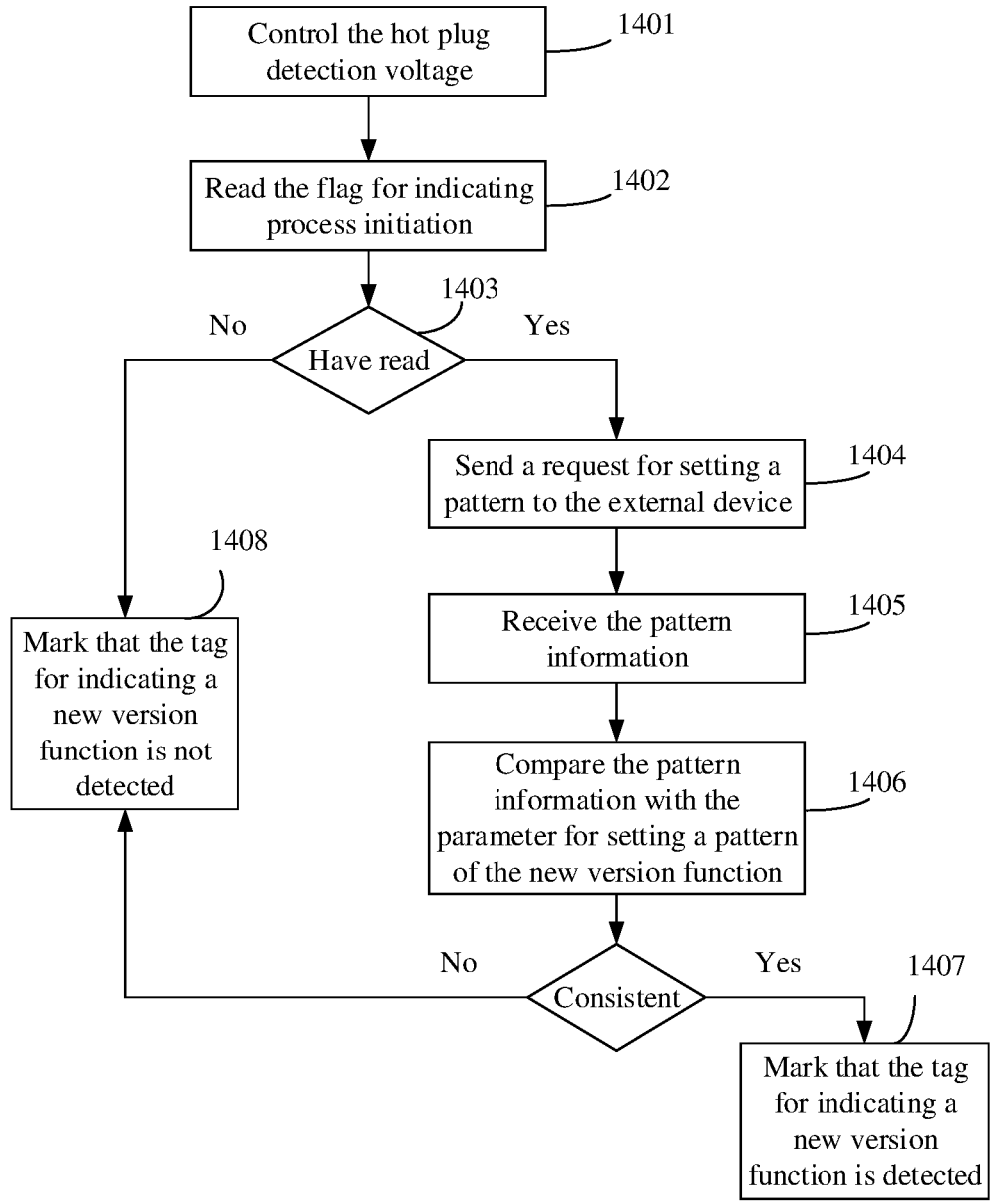
FIG. 14 shows a schematic flowchart of detecting the configuration process of a new version function according to some embodiments.
Figure 15:
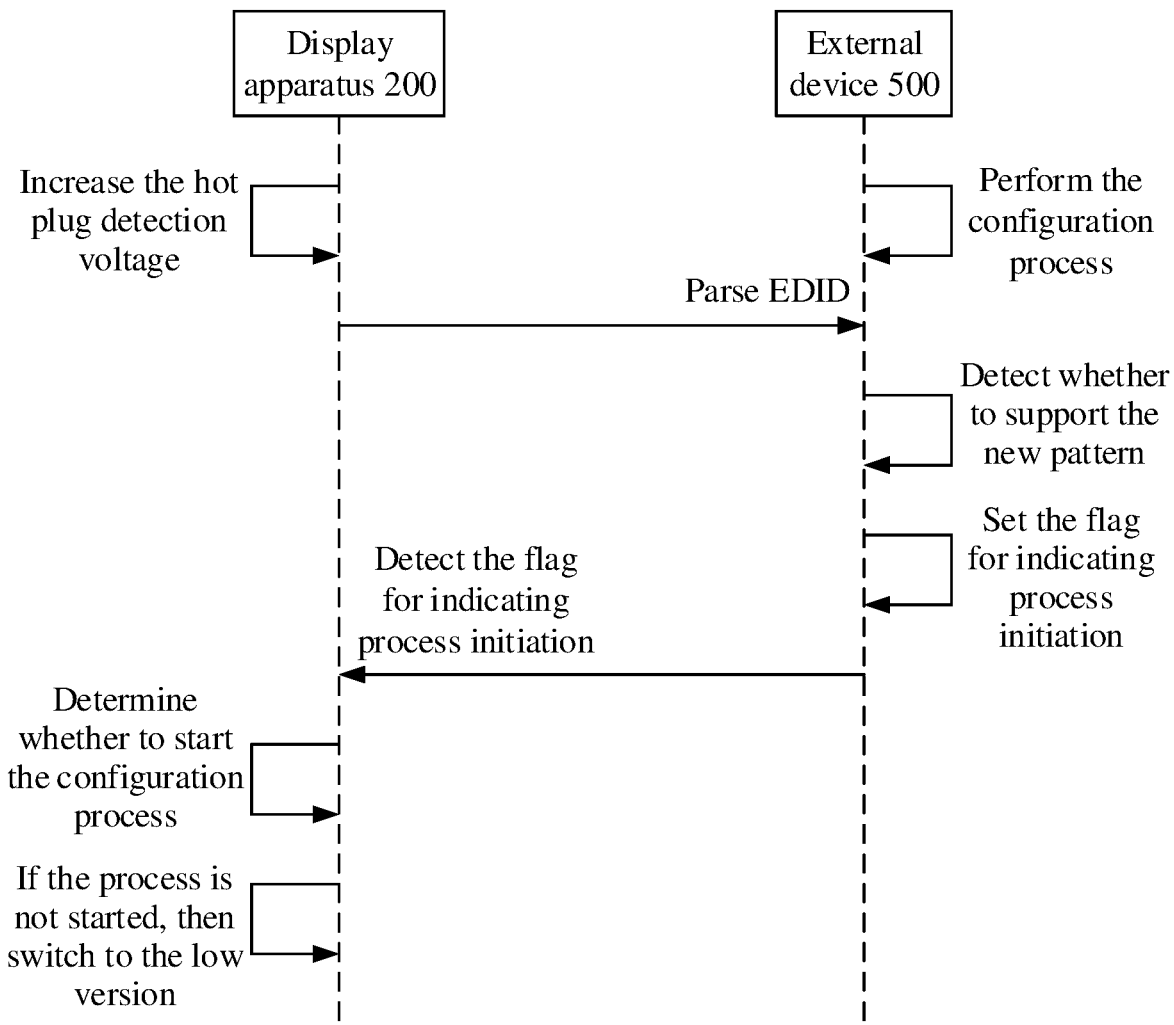
FIG. 15 shows a schematic flowchart of detecting the configuration process based on a flag for indicating process initiation according to some embodiments.

For the external device not recorded in the device management list, in order to enable the external device to configure the new version function, FIG. 14 is a schematic flowchart of detecting the configuration process of the new version function according to some embodiments. As shown in FIG. 14, the display apparatus can cause the external device to initiate the configuration process of the new version function by controlling the Hot Plug Detection (HPD) voltage (1401) in order to detect the tag for indicating the new version function in some embodiments. For example, FIG. 15 is a schematic flowchart of detecting the configuration process according to a flag for indicating process initiation according to some embodiments of the disclosure. As shown in FIG. 15, after determining that the device identification information of the currently connected external device is not included in the device management list, the display apparatus can pull up the HPD voltage and set "FLT_Ready" to 1 simultaneously, to instruct the external device to start the FRL training process. When starting the FRL training process, the external device can parse the EDID corresponding to the display apparatus and determine whether the display apparatus supports the FRL mode.

After controlling the external device to initiate the configuration process of the new version function, the display apparatus can read the flag for indicating process initiation within a preset detection period (1402) to detect whether (1403) the external device is configured with the new version function, where the flag for indicating process initiation is a flag field set by the external device in the register. For example, for an external device that supports the version HDMI2.1, when detecting: FRL_MAX_Rate>0, SCDC_present=1 and sink Version number≠0, the external device determines that the current display apparatus supports FRL, so the external device then reads whether SCDC FLT_Ready is 1; when the external device determines that FLT_Ready=1, the external device may set FRL_Rate and Feed Forward Equalization (FFE) level in the corresponding register, and the display apparatus can determine whether the external device initiates the FRL training process by detecting whether FRL_Rate and FFE level are set in the corresponding register.

Figure 16:
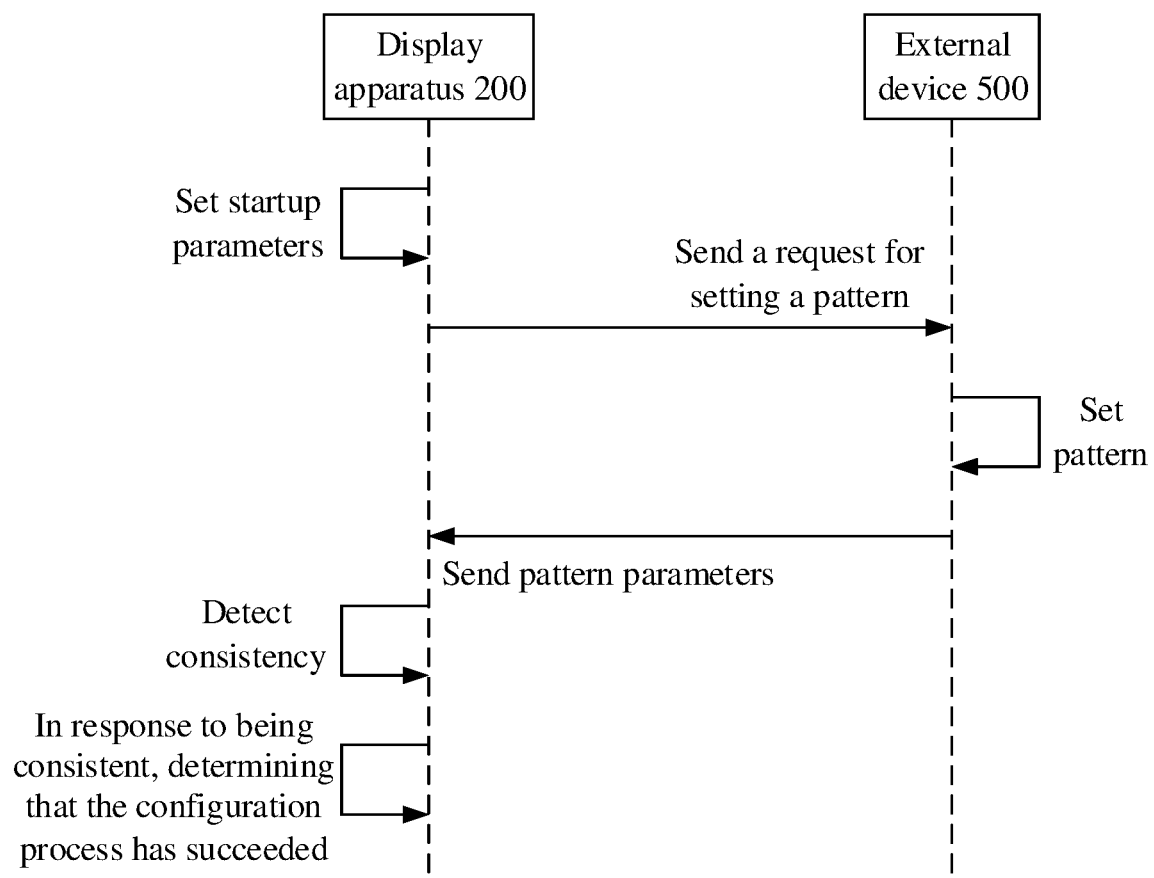
FIG. 16 shows a schematic flowchart of detecting pattern parameter consistency according to some embodiments.

If no flag for indicating process initiation is found within the preset detection period, it can be determined that the current external device has not initiated a configuration process of the new version function, so it can be marked that the tag for indicating the new version function has not been detected, and it can be determined that the current external device does not support the new version of transmission protocol, and the data connection relationship is established based on the old version of transmission protocol. If the flag for indicating process initiation is found within the preset detection period, it means that the external device can initiate the configuration process of the new version function. In order to accurately determine whether the external device supports the new version of transmission protocol, the display apparatus can also send (1404) a request for setting a pattern of each data transmission lane to the external device and receive (1405) the pattern information returned from the external device according to the request in some embodiments. For example, FIG. 16 is a schematic flowchart of detecting the pattern parameter consistency according to some embodiments of the disclosure. As shown in FIG. 16, the display apparatus can set parameters in such a way that FRL_Start=0, and request a pattern for each lane through the Ln(x)_LTP_req register. After detecting the register parameter, the external device can send the pattern of the corresponding lane pair according to the Ln(x)_LTP_req register, so as to set the pattern for each lane.

The display apparatus then compares (1406) the pattern information with the setting pattern parameter of the new version function. If the pattern information is consistent with the setting pattern parameter of the new version function, it is marked that (1407) the tag for indicating the new version function has been detected. Similarly, if the pattern information is not consistent with the setting pattern parameter of the new version function, it is marked (1408) that the tag for indicating the new version function has not been detected. For example, when detecting that the received pattern is consistent with the setting parameter (pattern) of the HDMI2.1 version, the display apparatus can determine that the FRL training has been successfully completed, so the Ln(x)_LTP_req register can be set to 0 which indicates the completion of the FRL training, that is, it is determined that the external device supports the HDMI2.1 version.

Figure 17:
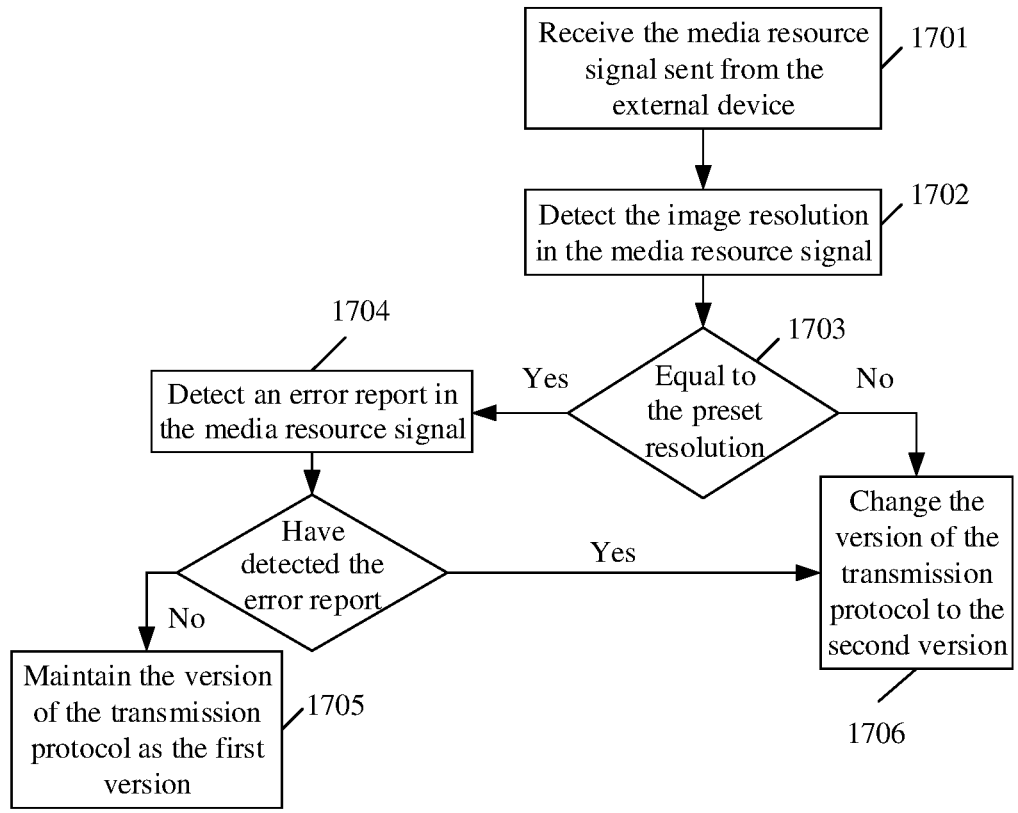
FIG. 17 shows a schematic flowchart of monitoring a transmission process of a media resource signal according to some embodiments.

After detecting the transmission protocol version supported by the external device, the display apparatus can establish data communication between the display apparatus and the external device based on the corresponding version, and transfer the media resource data. In order to stabilize the subsequent transmission process of the media resource data, after the display apparatus detects that the FRL training process has been successfully completed, the display apparatus may not directly maintain the EDID at the version 2.1, but also needs to determine whether there is an error in the signal transmission process and whether the detected resolution is correct. In some embodiments, FIG. 17 is a schematic flowchart of monitoring the transmission process of a media resource signal according to some embodiments of the disclosure. As shown in FIG. 17, after setting the transmission protocol as the first version, the display apparatus can receive the media resource signal sent from the external device (1701), and detect an error report in the media resource signal (1704). If no error report is detected within the preset monitoring period, the version of the transmission protocol is maintained as the first version (1705); if an error report is detected within the preset monitoring period, the version of the transmission protocol is set as the second version (1706).

In this case, the display apparatus can detect the image resolution in the media resource signal (1702) after changing the version of the transmission protocol to the first version; and compare the detected image resolution with the preset resolution in the new version (1703). If the image resolution is equal to the preset resolution in the new version, it can be determined that the resolution in the signal transmission process is correct, so the transmission protocol can be maintained as the first version (1705). If the image resolution is not equal to the preset resolution in the new version, it can be determined that the resolution in the signal transmission process is incorrect, so the transmission protocol will be changed to a second version (1706). For example, through the detection of the error report and resolution in the signal transmission process, when there is no error and the resolution is correct in the signal transmission process, the EDID of the display apparatus remains unchanged at version 2.1, and the external device is labeled as version 2.1 device; if there is an error and the resolution is abnormal, it means that there is a problem with the signal quality when the device transmits the signal. The abnormality of the device or cable affects the user experience, so the EDID can be changed to the version 2.0 in this case.

After the display apparatus determines that the configuration process of the new version function is unsuccessful and changes the transmission protocol to an old version, the display apparatus can also detect the specific transmission protocol version supported by the external device. For example, after changing the EDID to version 2.0, the display apparatus can further detect the protocol to determine the specific protocol version(s) supported by the current external device.

Figure 18:
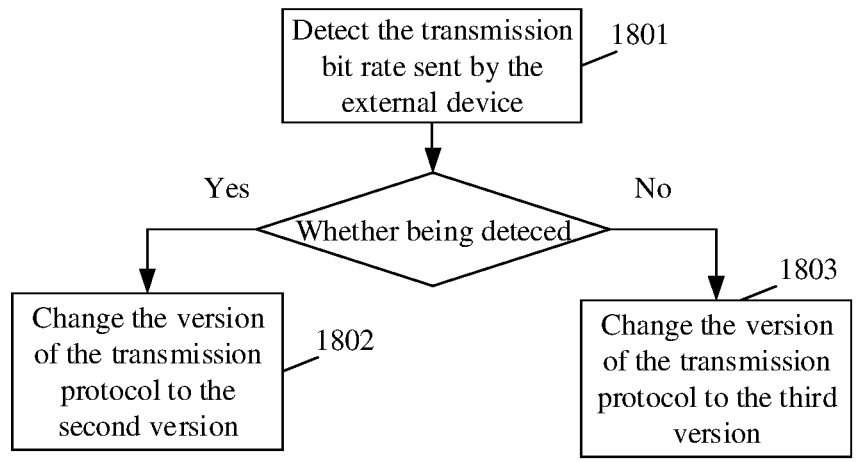
FIG. 18 shows a schematic flowchart of switching the transmission protocol version based on the transmission bit rate according to some embodiments.

The display apparatus can determine whether the external device supports the HDMI2.0 version protocol by determining whether the content in the register exists. However, the SCDC communication in this case may fail and the inaccurate determination may occur in some times. FIG. 18 is a schematic flowchart of switching the transmission protocol version based on the transmission bit rate according to some embodiments of the disclosure. As shown in FIG. 18, in some embodiments, when changing the version of the transmission protocol to the second version, the display apparatus may detect the transmission bit rate sent from the external device (1801), where the transmission bit rate is a transmission parameter additionally configured in the second version of transmission protocol relative to a third version of transmission protocol. If the external device sends the transmission bit rate, the version of the transmission protocol is changed to the second version (1802); if the external device does not send transmission bit rate, the version of the transmission protocol is changed to the third version (1803). For example, after determining whether the content in the register exists, the display apparatus needs to determine whether the external device sends the TMDS bit rate. If the display apparatus detects the TMDS bit rate sent from the external device, the display apparatus can determine that the external device is a device that supports the HDMI2.0 protocol. If the content in the register exists or the TMDS bit rate is not detected, it is determined that the current external device does not support the HDMI2.0 version, so the display apparatus can be controlled to enable the EDID1.4 version.

Since different transmission protocols may adopt different data transmission methods, these transmission protocols have different signal transmission rates accordingly. For example, in the HDMI2.1 protocol the transmission bandwidth of the HDMI channel is increased from 18 Gbit/s of HDMI2.0 to 48 Gbit/s, and the 16b/18b encoding mode, rather than the Transition-minimized differential signaling (TMDS) encoding format used by HDMI1.4/2.0, is used. Therefore, the display apparatus can determine the transmission protocol version to which the current signal transmission process conforms by detecting the transmission bit rate.

Figure 19:
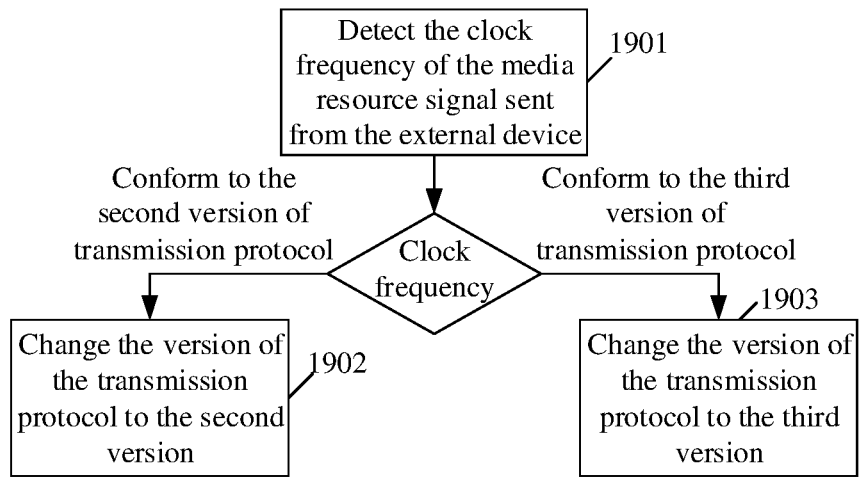
FIG. 19 shows a schematic flowchart of switching the transmission protocol version based on a clock frequency according to some embodiments.

FIG. 19 is a schematic flowchart of switching the transmission protocol version based on a clock frequency according to some embodiments. As shown in FIG. 19, in some embodiments, the display apparatus detects the clock frequency of the media resource signal sent from the external device when changing the version of the transmission protocol to the second version; in response to the clock frequency conforming to the rate specified in the second version of transmission protocol, the version of the transmission protocol is changed to the second version (1902); in response to the clock frequency conforming to the rate specified in the third version of transmission protocol, the version of the transmission protocol is changed to the third version (1903). For example, the display apparatus can detect the clock frequency (clk rate) of the signal from the external device. Since the transmission rates under HDMI1.4 and HDMI2.0 are different, it can be determined whether the external device is version 2.0 device according to the detected transmission rate.

Embodiments in which a mode determined according to a usage scene will be described below.

Figure 20:
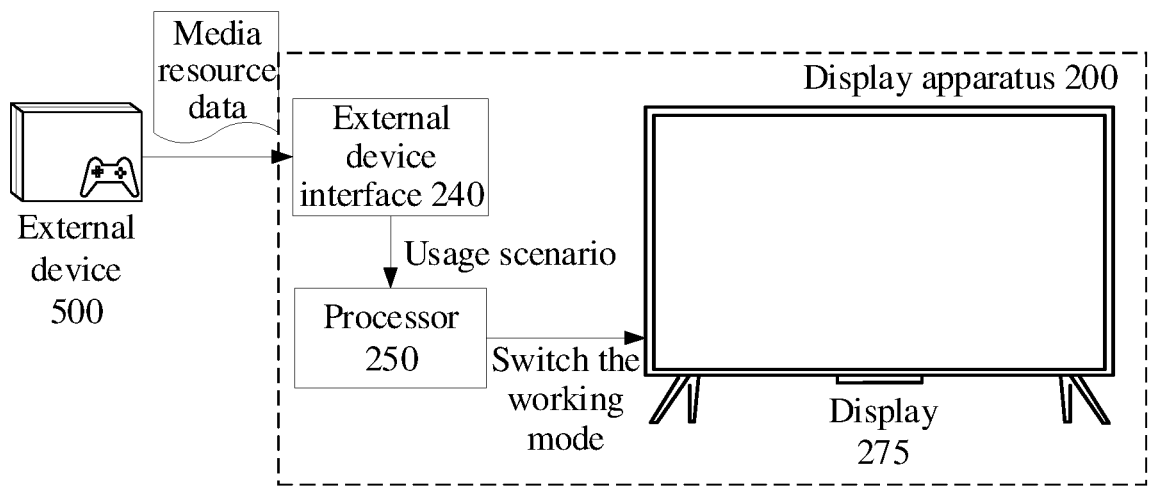
FIG. 20 shows a schematic flowchart of parameter adaption of the display apparatus according to some embodiments.

When the display apparatus and the game device is connected via the HDMI port, the game device is responsible for running a game application and forming the video data and audio data according to the user's interactive operation, while the display apparatus can passively obtain the audio data and video data output from the game device. The game device in different game modes requires the display apparatus to output video and audio in different modes for better picture quality and sound quality. However, the game device cannot directly adjust the output mode of the display apparatus, thus the output mode will be inconsistent with the usage scenario in some cases, which affects the video and audio effects. In order to adapt to the usage scenario of the external device, as shown in FIG. 20 which shows a schematic flowchart of parameter adaption of the display apparatus, some embodiments of the disclosure provide a display apparatus, including a display, a communicator, a memory and at least one processor, where the display is configured to present a user interface and an image corresponding to a video signal transmitted from the external device; the communicator is configured to communicate with the external device, so as to receive video data and/or audio data sent from the external device; the memory is configured to store instructions and data associated with the display, and the at least one processor is configured to detect the received video data and/or audio data, so as to determine information of a usage scenario of the external device according to the video data and/or audio data, and adjust the output mode according to the information of the usage scenario to implement the parameter adaption method.

In some embodiments, the display apparatus may have a built-in Low-latency Mode (LLM), and the external device may have a built-in Auto Low-latency Mode (ALLM). The low-latency mode at the Sink end (i.e., the display apparatus) may be automatically enabled or disabled by the source end according to a preset rule in the case without manually setting by the user at the Sink end. For example, when the user receives a video call while watching a movie, the external device as the source end will automatically stop playing the movie and notify the display apparatus at the Sink end to enable the low-latency mode, to ensure the real-time interactive performance of the video call. After the user ends the video call, the external device at the source end can resume the movie playing process, and notify the display apparatus at the sink end to disable the low-latency mode. In the process of transmitting video signals and audio signals from the external device to the display apparatus, the display apparatus can detect the use mode of the external device by parameter adaption method, and automatically adjust the output mode according to different use modes.

In some embodiments, the at least one processor may be configured to execute the instructions to cause the display apparatus to perform: receiving the media resource information sent from the external device, and detecting a use mode of the external device according to the media resource information. Every time an external device is connected with the display apparatus, the display apparatus can detect the operations of the external device in real time, thereby determining the use mode of the external device. The specific detection method may include: the display apparatus reads a data frame in the media resource information, and determines the use mode of the external device according to the reading result of the data frame. For example, the HDMI protocol specifies a data frame (SPD) that describes the information of the device itself, and the external device can send the data frame according to a preset time interval while transmitting the media resource information data. After receiving the data frame, the display apparatus reads the device classification at a specific byte position from the data frame, for example, "8" represents "game device", "9" represents "host device", "10" represents "DVD device", etc.

Before determining the use mode of the external device, the display apparatus may also determine whether the external device supports the function of sending the use mode. For example, whether the external device supports the ALLM can be determined by reading the value of the ALLM flag position in the VSIF (Vendor Specific info Frame). If the value of the ALLM flag position in the VSIF is a first value (for example, 1) at a certain moment, this means that the device supports the ALLM. Therefore, the SPD description information of the external device is then read and recorded in the database, so as to automatically enable the ALLM function of the display apparatus when this type of device connects again.

If the external device supports the ALLM, the display apparatus will automatically enable the ALLM processing mechanism, so as to dynamically update the picture quality and sound quality parameters of the display apparatus according to the ALLM state sent from the external device. For example, when the ALLM state of the game device is a second value (for example 0), meaning that no game is being played but a movie may be played, parameters of the picture quality and sound quality of the display apparatus should remain in the user-defined state; when the ALLM state of the game device is 1, meaning that a game is being played, the display apparatus can further determine the game types through image recognition, and set the parameters of picture quality and sound quality of the display apparatus according to values preset for the game type, to obtain the better display effect. If the external device does not support the ALLM, the display apparatus can obtain the SPD information of the external device. If it is determined in the SPD information that the external device is a game device, it can be assumed that the external device is always playing a game. In this case, the display apparatus further determines the game type through image recognition, and sets the parameters of picture quality and sound quality of the display apparatus according to the values preset for the game type.

Figure 21:
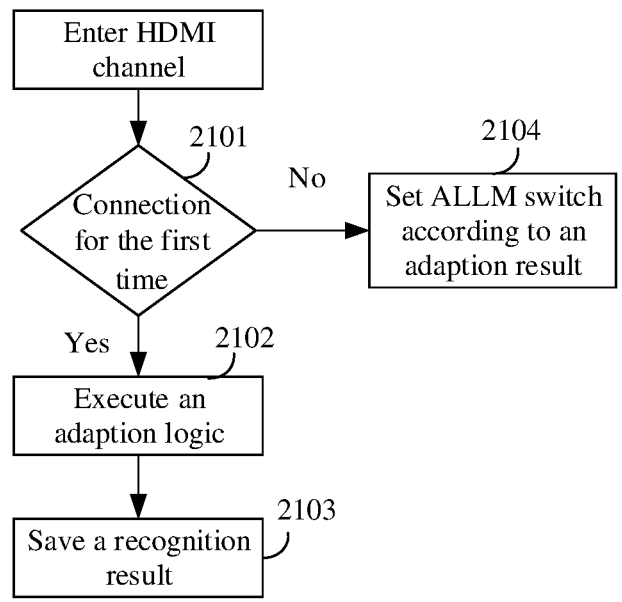
FIG. 21 shows a schematic flowchart of determining a first access state according to some embodiments.

In some embodiments, when the external device is connected with the display apparatus for the first time, the adaptive logic may also be executed, and the identification result may be saved. FIG. 21 is a schematic flowchart of determining the state of connection for the first time according to some embodiments of the disclosure. As shown in FIG. 21, when an external device is connected with the display apparatus, the display apparatus can firstly determine whether the current external device is connected with the display apparatus for the first time (2101). If the external device is connected with the display apparatus for the first time, the SPD description information of the external device can be extracted (2102), and the above adjustments for the parameters of picture and sound quality are performed, and the adjusted parameters are stored and recorded (2103). When the external device is connected with the display apparatus not for the first time, the stored adjustment parameters can be directly invoked according to the device information to directly obtain the adaptive result. In this case, the display apparatus can also set an ALLM switch according to the adaptive result (2104), and execute adjustment programs for different picture quality and sound quality according to the switch state of the ALLM.

In some embodiments, when the ALLM switch is in the on state, the display apparatus can detect the change of the ALLM state of the external device in real time through a loop body. If the ALLM state changes to ALLM=1, then the video data and/or audio data sent from the external device is/are further obtained, so as to detect the usage scenario of the external device according to the data. For example, the display apparatus can obtain a game image of the external device, perform image analysis processing on the game image to determine the game type to which the current game image belongs, and set different parameters of picture quality and sound quality for different game types. For example, for shooting, sport and action game types, it is necessary to reduce the delay of the game image to make the game experience smoother. If the ALLM state changes to 0, the processing on the picture quality and sound quality can be stopped, and the parameters of picture quality and sound quality are restored to the user-defined values, so as to ensure the normal viewing experience for the user.

In some embodiments, when the ALLM switch is in the off state, the display apparatus cannot directly obtain the usage scenario of the external device through the ALLM protocol, while the SPD information of the external device can be obtained. That is, if the media resource data sent from the external device includes the SPD information, the SPD information can be parsed, to obtain the device type of the external device firstly, and then select different methods for adjusting picture quality and sound quality according to different types of external devices. For example, the display apparatus can determine whether the external device is a game device by parsing the SPD information. If the external device is a game device, the type of the currently-run game can be determined according to the game image, and different parameters of picture quality and sound quality can be set for different game types. If the external device is not a game device, the parameters of picture quality and sound quality can be restored to the user-defined values, so as to ensure the normal viewing experience of the user.

Embodiments in which sound and picture quality can be matched with a game type will be described below.

In order to obtain a better playing effect, the display apparatus can adjust the picture quality or sound quality of the played audio and video content. For example, the display apparatus can run the Motion Estimation and Motion Compensation (MEMC) algorithm, to estimate the trajectory of the object movement in the display image and compensate for the image that does not exist in the video source, so that the dynamic effect of the image is smoother. The user can control the display apparatus to play according to set parameters, while the parameters for adjusting the picture quality and sound quality can be preset. After the display apparatus is connected with the external device, the display apparatus can play different pictures or sounds according to different audio and video data sent from the external device. However, an image or sound will be played with better quality when enabling a specific adjustment mode for the sound and picture quality. For example, the shooting game image is displayed better in the mode with higher brightness and definition, which is more helpful for the player to capture the subtle scenes of the game image; while a casual game image requires a mode where the color temperature can be adjusted into a warm color for visual fatigue relief. However, the mode for adjusting sound and picture quality of the display apparatus is usually unchanged once it has been set. Therefore, in some scenes, the currently played audio and video data may be inconsistent with the mode for adjusting the sound and picture quality, resulting in poor display or sound effect.

Figure 22:
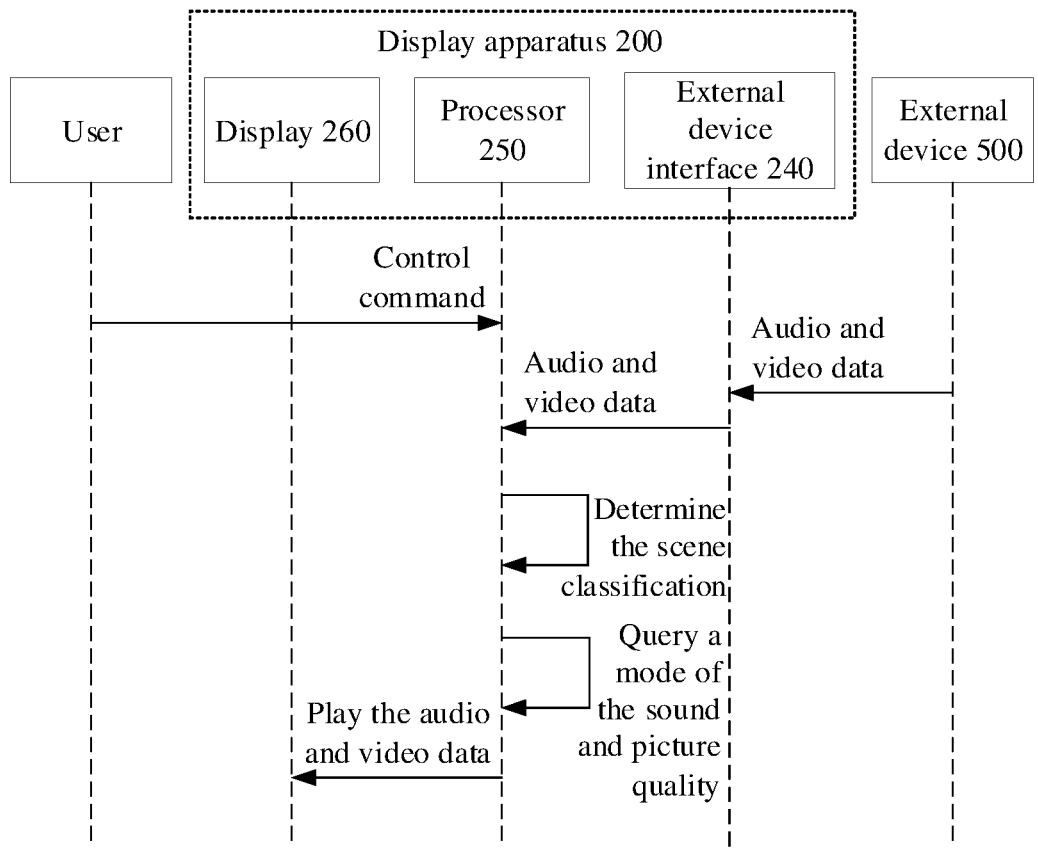
FIG. 22 shows a timing chart of a method for adjusting a parameter of sound and picture according to some embodiments.

In view of the above issues, some embodiments of the disclosure provide a method for adjusting a parameter of sound and picture, which can be used in a display apparatus, to enable the display apparatus to automatically identify the scene classification and automatically select the appropriate mode of sound and picture quality according to the scene classification. In some embodiments, the at least one processor can implement the sound and picture parameter adjusting method by running an application corresponding to the method for adjusting sound and picture parameter. FIG. 22 is a timing relationship diagram of the method for adjusting sound and picture parameter according to some embodiments of the disclosure. As shown in FIG. 22, the method specifically includes: obtaining a command for adjusting the sound and picture quality from a user. After the display apparatus establishes communication with the external device, the display apparatus can receive the audio and video data sent from the external device via the external device interface. The audio and video data can present different picture content according to different operation scenarios of the external device. For example, when the display apparatus is connected with a game device, the game device can generate and render the audio and video data by running a game program, for example, when the game device runs a shooting game, the game device can generate a shooting game image and send the game image to the display apparatus in the form of audio and video data.

Figure 23:
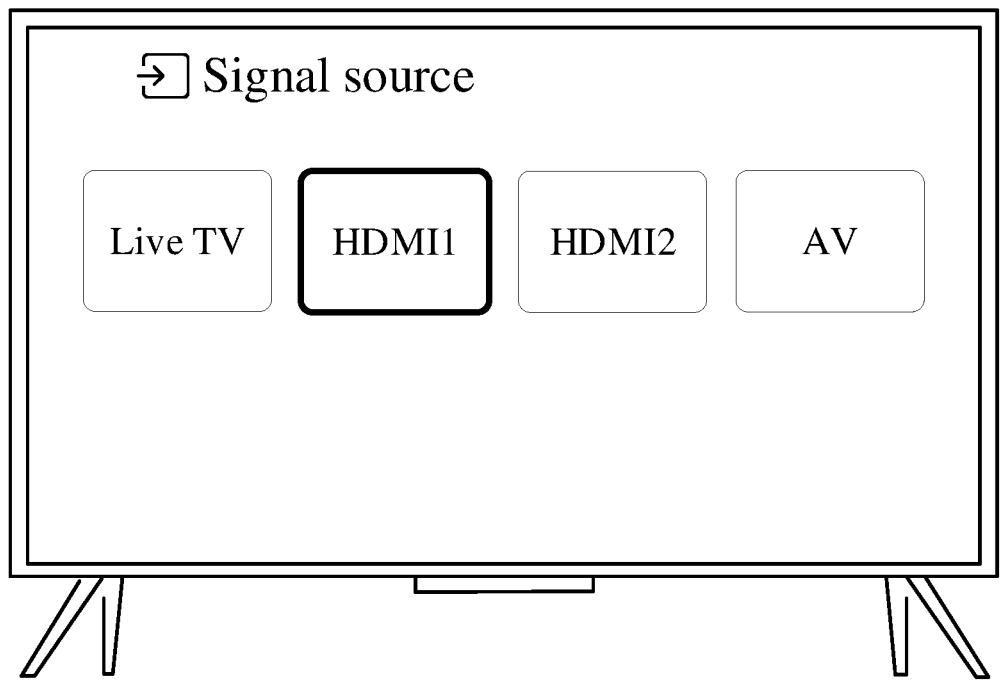
FIG. 23 shows a schematic diagram of an interface for signal source selection according to some embodiments.

The user can control the display apparatus to play the audio and video data sent from the external device by inputting a series of interactive operations. For example, FIG. 23 shows a schematic diagram of an interface for selecting a signal source according to some embodiments of the disclosure. As shown in FIG. 23, after the game device is connected with the HDMI1 port of the display apparatus, the user can control the display apparatus to change the signal source via "signal source" button or a direction key and the OK key on the control device 100 and based on the interface for selecting the signal source, so that the signal source of the display apparatus is the HDMI1 interface. After setting the signal source, the display apparatus can receive a game image generated by the game device from the HDMI1 interface, and automatically play the audio and video data corresponding to the game image, that is, the user inputs the command for adjusting the sound and picture quality when controlling the display apparatus to change the signal source through the control device 100.

In some embodiments, the display apparatus can also automatically play the signal corresponding to the external device when the external device is connected or a signal is input. For example, the display apparatus can continuously monitor the connection state of the HDMI1 port. When a game device is connected via the HDMI1 port of the display apparatus, the display apparatus can automatically switch the signal source to the HDMI1 interface to play the audio and video data sent from the game device.

The display apparatus can adjust the sound and picture quality in response to the above command, while the process for adjusting the sound and picture quality is usually oriented to the specific audio and video image. Therefore, in some embodiments, the display apparatus can monitor whether the external device sends the audio and video data that requires the sound and picture quality adjustment, and perform the sound and picture quality processing when detecting that the external device sends the corresponding audio and video data. For example, when the game device is connected with the display apparatus but does not run a specific game program, the display apparatus does not need to adjust the sound and picture quality; when the game device runs a specific game program, a tag is added to the HDMI protocol frame, and the display apparatus can start to execute the related program for adjusting the sound and picture quality when detecting this tag, which is equivalent to inputting a command for adjusting the sound and picture.

Figure 24:
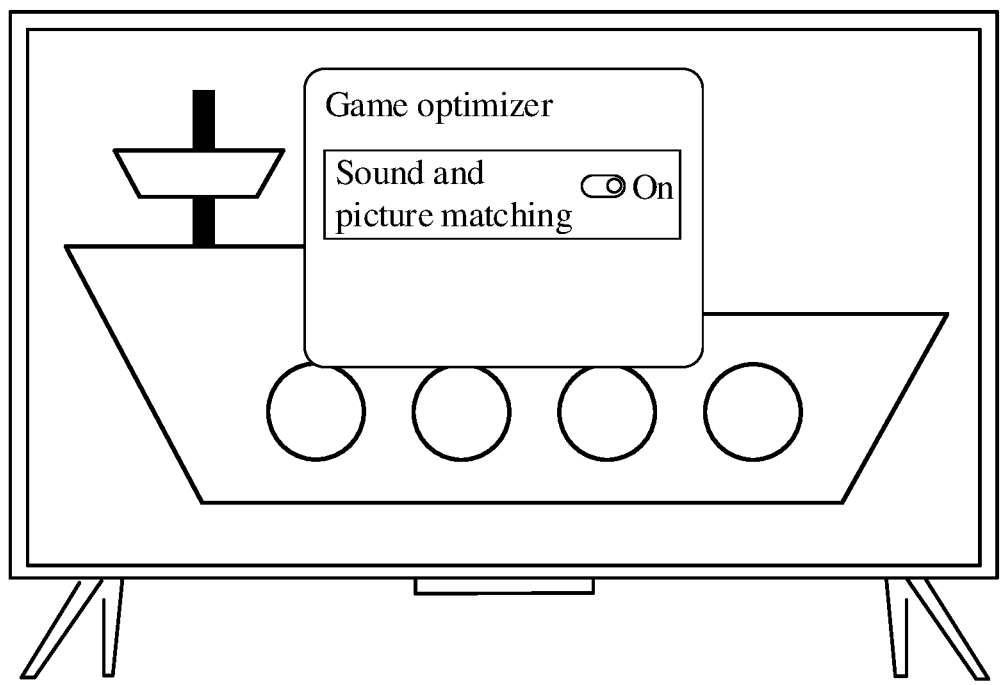
FIG. 24 shows a schematic diagram of a window of a game optimizer according to some embodiments.

In some embodiments, the user can also manually control the display apparatus to adjust the sound and picture quality. For example, FIG. 24 shows a schematic diagram of a game optimizer window according to some embodiments of the disclosure. As shown in FIG. 24, when the display apparatus displays the game image sent from the game device, the display apparatus can display the game optimizer window, which may include a control "sound and picture matching" for user's selection. When the user selects the control "sound and picture matching" and presses the OK key, the display apparatus starts to execute the subsequent sound and picture quality adjustment program, that is, input a command for adjusting the sound and picture quality.

After the user inputs the command for adjusting the sound and picture quality, the display apparatus may analyze and process the received audio and video data in response to the command, so as to determine the scene classification according to the audio and video data, where the scene classification refers to the scene classification when the external device sends the audio and video data. For example, when the external device connected with the display apparatus is a game console, the game console requires different sound and picture quality effects when running different types of games, so the game type can be used as scene classification, that is, the scene classification includes shooting, action, sport, leisure, etc. The scene classification can be obtained by performing image recognition on the picture content in the audio and video data. That is, after obtaining the command, the display apparatus may firstly determine at least one image to be recognized in the audio and video data, and perform the image recognition on the image to be recognized, to obtain the information related to the scene classification from the image to be recognized. For example, the display apparatus can sample the audio and video data sent from the game device, extract the same image as the display image, perform the Optical Character Recognition (OCR) on the image to recognize characters from the extracted image, and determine the game name of the run game by matching a segment in the characters or texts.

In some embodiments, during the process of determining the scene classification, the display apparatus may determine the feature information in the image to be recognized after extracting the image to be recognized from the audio and video data, so as to determine the corresponding scene classification when the image to be recognized includes the preset feature information. For example, an image for a shooting game may usually include a gun model, so the scene classification corresponding to the current game image is determined as shooting when the image to be recognized includes a gun model. Similarly, an image for an action game usually includes a cold weapon model; and an image for competitive sport game usually includes a vehicle and sporting goods model. The display apparatus can determine the scene classification to which the corresponding game image belongs by recognizing the above-mentioned model features in the image to be recognized. For an image for leisure game, since the image usually includes no specific model feature, the display apparatus can determine that the current game image belongs to a leisure game when the features of the three game categories described above is not found in the image to be recognized.

In some embodiments, during the process of determining the scene classification, the display apparatus may also determine and analyze the characteristics of the image to be recognized, including the color type, color element, scene style, etc. of the image. For example, the images of shooting and action games usually have rich color composition, the images of competitive sport games usually have more realistic scene, and the images of leisure games usually have single color element, etc. The display apparatus can further confirm the scene classification of the current audio and video data according to these characteristics. It should be noted that, in the process of determining the scene classification of the audio and video data, the display apparatus can adopt one or a combination of the above-mentioned identification methods to obtain more accurate determining result of the scene classification.

After obtaining the scene classification by performing the image recognition on the audio and video, the display apparatus may perform a query based on the determined scene classification, so as to determine the mode of the sound and picture quality that conforms to the scene classification. Since different scene classifications correspond to different characteristics, the display apparatus may preset different adjustment strategies of sound and picture quality according to different scene classifications, to obtain the better display effect. For example, for a shooting game, in order to facilitate the user to quickly determine the shooting target, the definition and brightness of the game image can be appropriately increased so that the user can clearly see the details of the dark part. For an action game, the chroma value can be increased to make colors more saturated. For a competitive sport game, the standard color tone can be maintained to restore the more realistic scene effect. For a leisure game, the color tone of the picture can be adjusted to warm colors to make the viewing process more comfortable for users.

Similarly, for the sound quality adjustment process, different sound quality adjustment strategies can be set according to different scene classifications. For example, for a shooting game, the middle and high-frequency sounds in the audio output process can be increased, to enhance the sound definition and improve the positioning sense; for an action game, the bass volume can be increased, to make the impact more intense; and for a competitive sport game, the gain of the output path of the surround sound can be increased, to enhance the sense of surround and create the sense of presence experience. The sound and picture quality adjustment policy corresponding to each scene classification may be pre-stored in the database as a comparison table. After the display apparatus determines the scene classification through image recognition, the display apparatus can invoke the comparison table from the database, and match in the comparison table according to the scene classification name (or code), so as to determine the mode of sound and picture quality that conforms to the scene classification. For example, when determining the scene classification as shooting game, the display apparatus can invoke the comparison table 3 from the database.

TABLE 3

| Scene classification | Shooting | Action | Sports competitive | Leisure |
| --- | --- | --- | --- | --- |
| Classification code | Game type 01 | Game type 02 | Game type 03 | Game type 04 |
| Sound quality strategy | Medium and high frequency + n1%; . . . | Bass volume + n2%; . . . | Surround gain + n3%; . . . | None |
| Picture Quality Strategy | Definition + m1%; Brightness + m2%; . . . | Chroma value + m3%; . . . | Switch to standard color tone mode; . . . | Switch to warm color tone mode; . . . |

According to the above comparison table, the display apparatus can query the sound quality adjustment strategy and picture quality adjustment strategy corresponding to the shooting game, that is, when playing the audio, the gain of the output path in the mid-high frequency band in the audio is increased by n1% to improve the positioning sense of sound. When playing a video, the definition of the display picture is increased by m1%, and the brightness is increased by m2%, so as to clearly display the details of the dark portion. Here, the specific adjustment values of the sound quality strategy and the picture quality strategy need to be comprehensively set according to the hardware configuration of the display apparatus to achieve the best display effect. After determining the mode of the sound and picture quality via query, the display apparatus can play the audio and video data according to the mode of the sound and picture quality. That is, the display apparatus can obtain the image parameter and/or sound parameter based on the mode of the sound and picture quality (such as by parsing information about the mode); and then set the image output mode according to the image parameter, and/or set the gain of the audio output path according to the sound parameter.

It should be noted that, in the process of adjusting the image output mode and the gain of the audio output path, the display apparatus needs to detect the output mode before adjustment, and comprehensively determine the final display effect according to the output mode before adjustment and the sound and picture quality mode to be adjusted to. For example, when the display apparatus detects that the current external device runs a shooting game, the display apparatus can firstly determine the current image quality output mode and the gain of the audio output path, i.e., the standard image quality mode (the definition is 50%, and the brightness is 50%) and standard sound quality mode (the gain of the audio output path is equal to 50% for each frequency band). In this case, the display apparatus then determines the image quality adjustment strategy and the sound adjustment strategy according to the above comparison table. According to the picture quality adjustment strategy, the display apparatus can adjust the output image of the display 260 as follows: the definition is increased by 30% (that is, the adjusted definition is 80%), and the brightness is increased by 20% (that is, the adjusted brightness is 70%); and the display apparatus also sets the gain of the audio output path according to the sound quality adjustment strategy as follows: the medium-high frequency is increased by 20% (that is, the adjusted output gain of the audio path of the medium-high frequency band is 70%). Meanwhile, in order to obtain the better sound immersion effect, the display apparatus may also enable the sound effect such as surround sound in response to detecting the shooting game.

In some embodiments, different scene classifications require different adjustment strategies of the sound and picture quality, so the display apparatus also needs to adjust the sound and picture quality in response to a change of the scene classification of the external device, to adapt to the new scene classification. For example, when the display apparatus detects that the external device switches from running a shooting game to running an action game, the display apparatus firstly switches the sound and picture quality mode back to the standard mode, and then performs the sound and picture quality adjustment adapting to the action game based on the standard mode. That is, according to the sound quality adjustment strategy, the bass volume is adjusted from 50% to 75% to increase the percussive sound effect; and according to the picture quality adjustment strategy, the chroma value is adjusted from 50% to 60% to make the picture color more saturated. As can be seen, in some of the above embodiments, the display apparatus can automatically determine the scene classification of the external device, and automatically adjust the playing mode of the audio and video data according to the determined scene classification, to realize the automatic matching between the scene classification and the parameters of the sound and picture, so that the display apparatus can maintain the adjustment mode of the sound and picture quality that conforms to the audio and video data, improving the picture display effect under different scene classifications.

As can be seen from some of the above embodiments, in the automatic matching process of the sound and picture quality mode, the display apparatus mainly relies on the determining result of the display apparatus for the current scene classification of the external device. That is, the more accurate the determining result of the scene classification, the easier it is for the audio and video data to adapt to the mode of the sound and picture quality. Therefore, in order to improve the determining accuracy of the scene classification, the display apparatus can receive the audio and video data in the step of determining the scene classification according to the audio and video data and then generate the video data to be recognized according to the audio and video data in some embodiments, where the video data to be recognized is specially used to determine the current scene classification of the external device. That is, the video data to be recognized is the video data stored by the external device interface in a period between the time when the audio and video data is received by the external device interface and the time when the external device enters an application scenario. For the convenience of description, the period for obtaining the video to be recognized is denoted as an analysis period. That is, the analysis period starts when the external device interface receives the audio and video data, and ends when the external device enters an application scenario.

For example, the display apparatus can determine on the data received by the HDMI port by detecting the hot plug voltage. When the external game device sends the audio and video data to the display apparatus via the HDMI port, the display apparatus can store the video data in the received audio and video data. When the game device is controlled to run the game application to enter the game state, the display apparatus can read the notification information of entering the game state from the received audio and video data. During the period from the time of receiving the audio and video data to the time of the external device entering the game state, the video data stored by the display apparatus is the video data for recognition.

Figure 25:
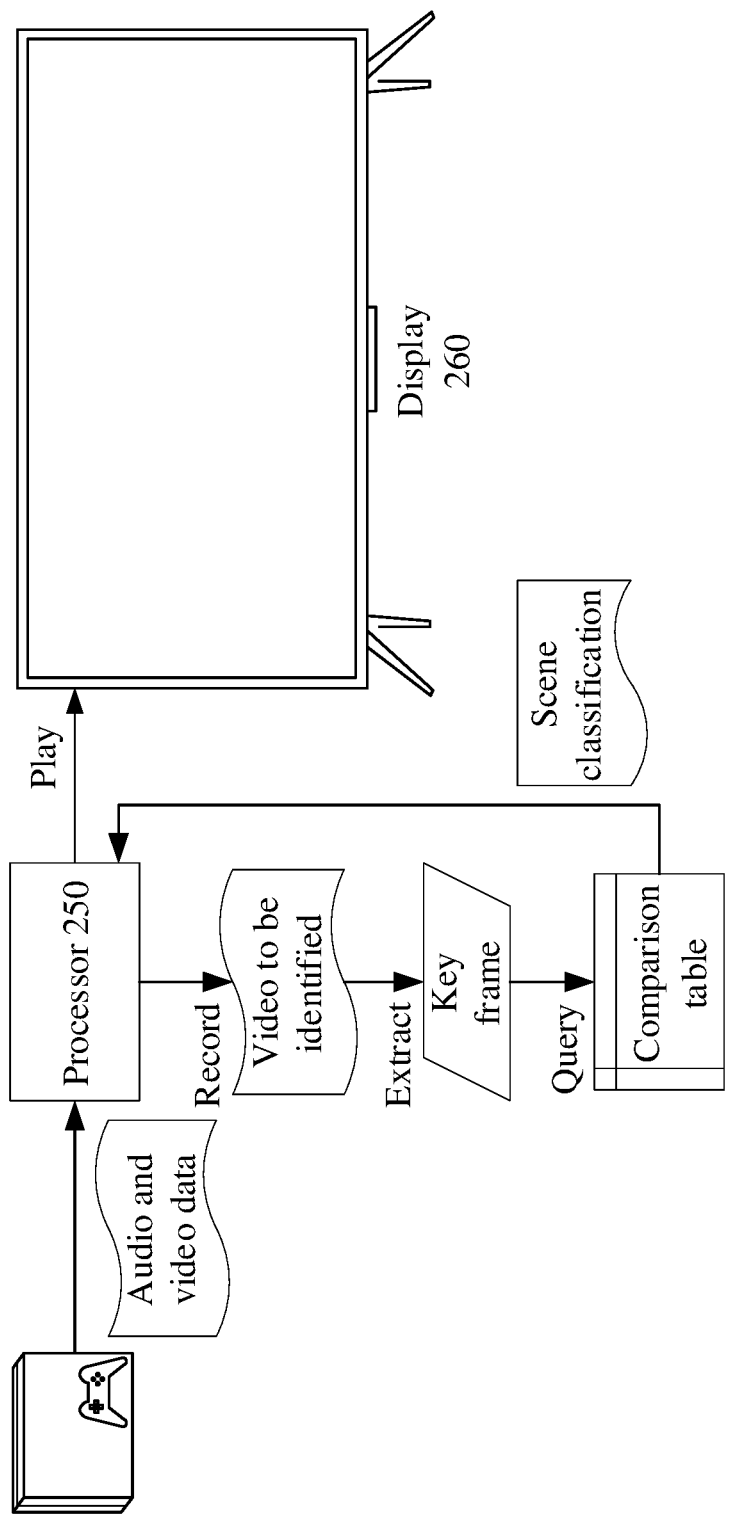
FIG. 25 shows a schematic flowchart of determining a scene classification based on a key frame according to some embodiments.
Figure 26:
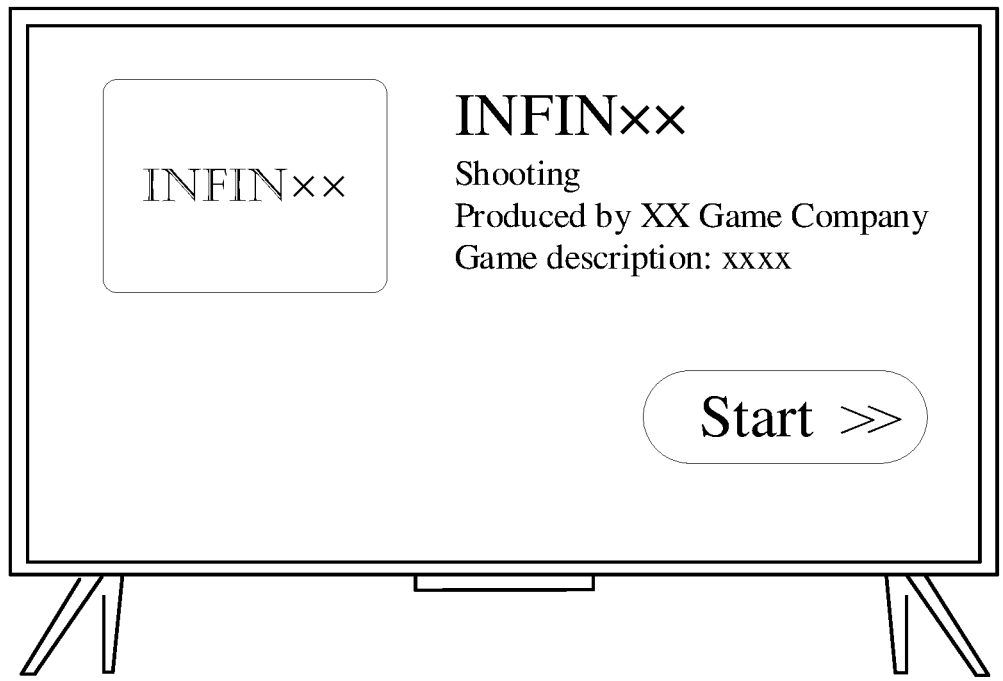
FIG. 26 shows a schematic diagram of an interface showing game details according to some embodiments.

Since some audio and video data cannot be saved during transmission, as shown in FIG. 25, the disclosure provides a method of determining the scene classification based on a key frame. The display apparatus can detect the audio and video data received via the external device interface, and start recording the picture content displayed on the display 260 when detecting that the audio and video data is input via the external device interface. In this case, the display apparatus can also obtain the notification information that the external device enters an application scenario, and stop recording the picture content shown on the display 260 when obtaining the notification information, to generate the video data to be recognized. After generating the video data to be recognized, the display apparatus may extract a key frame from the video data to be recognized in reverse chronological order, where the key frame is a display picture including the scenario name of the application scenario from multiple frames of display pictures of the data to be recognized. For example, FIG. 26 shows a schematic diagram of an interface showing game details according to some embodiments of the disclosure. As shown in FIG. 26, the key frame may be a display image corresponding to the interface showing the game details, that is, when using the game device, the user can select any game icon in the game list interface, then the game device can skip to the interface showing game details, which can include the unique logo, game name, game classification, game developer and game description of the selected game.

After extracting the key frame, the display apparatus can perform the image recognition on the key frame so as to determine a name of the application scenario from the key frame image, and query the scene classification according to the name. For example, after extracting the key frame image corresponding to the interface showing the game details, the display apparatus can obtain the game's unique logo from the key frame image through the OCR algorithm, and parse the logo content, including text content, graphic content, etc. The logo content obtained by parsing is then compared with the preset game names in the database, a game name with higher accuracy can be obtained, and then the game type can be obtained.

Figure 27:
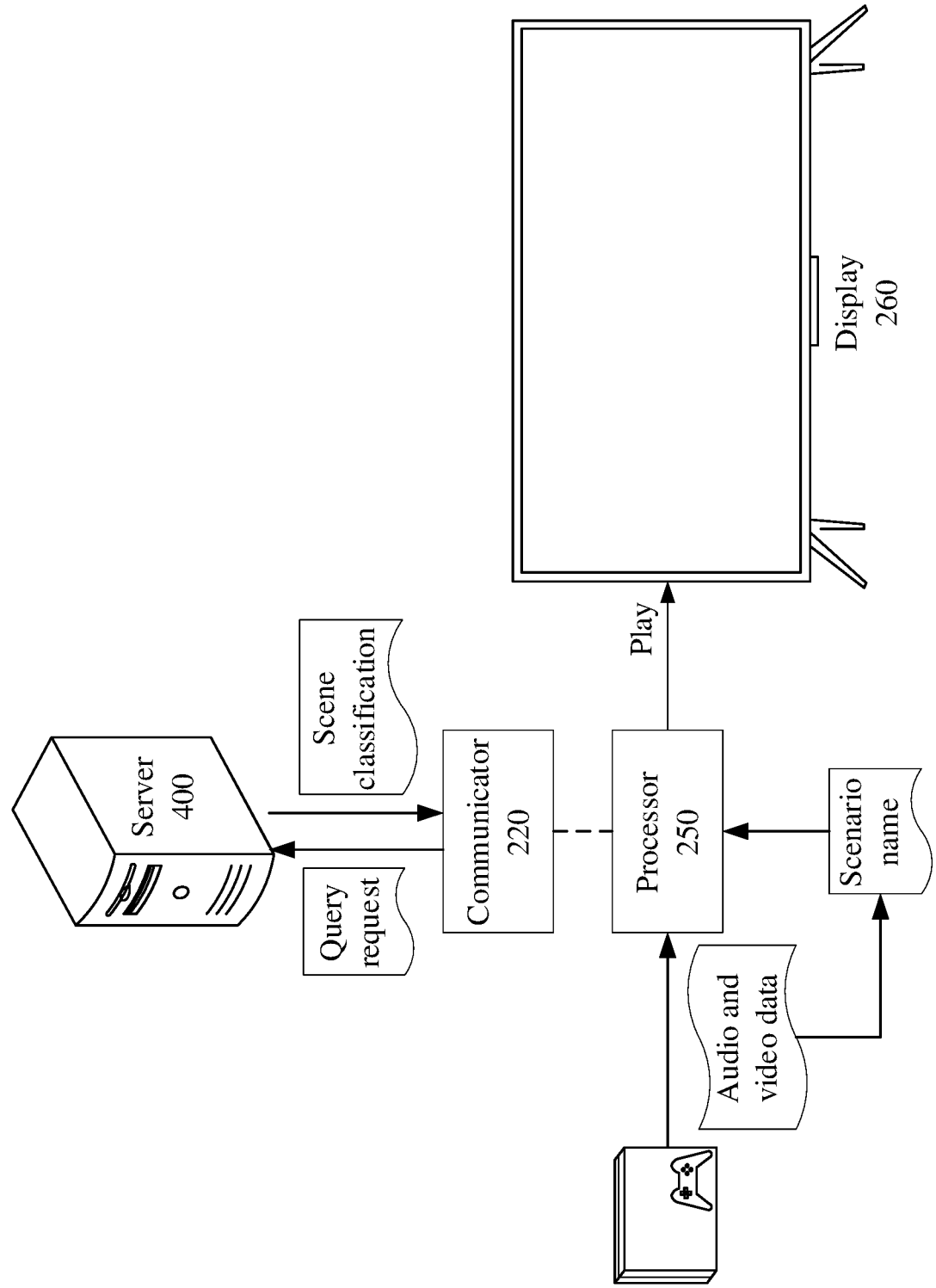
FIG. 27 shows a schematic flowchart of querying a scene classification via a server according to some embodiments.

The types of the external device 200 are complex and the number of corresponding application scenarios is large, so it is not convenient to store a large amount of scene information in the display apparatus. FIG. 27 is a schematic flowchart of querying the scene classification from a server according to some embodiments of the disclosure. As shown in FIG. 27, the names and categories of application scenarios may be maintained by the cloud server in some embodiments. That is, the display apparatus can also include a communicator 220 configured to communicate with the server 400, through which a large number of scenario names and the scene information can be maintained as preset scenario information, for the display apparatus to query.

Based on this, the display apparatus may also generate a query request according to the scenario name and sends the query request to server 400 in the step of querying the scene classification according to the scenario name, to request the server 400 to calculate the matching degree between the scenario name and the preset scenario information, where the preset scenario information includes a standard scenario name and a scene classification corresponding to the standard scenario name. When the matching degree is greater than a matching threshold, the server 400 can send the information of the scene classification to which the scenario name belongs to the display apparatus. Then the display apparatus can obtain the corresponding scene classification by receiving the information of scene classification returned from server 400 for the query request. For example, the display apparatus can record the video data to be recognized starting from the HDMI starting reception of a signal and ending until the HDMI receiving the notification for indicating that the game device enters the game, and perform the image detection from back to front in reverse chronological order, to determine a game name being selected, i.e., "INFINxx" when the user enters the game state. Then the game name is sent to the cloud server in the query request. The cloud server can maintain the game name and the classification to which the game belongs, and determine the proportion of the number of same characters between the game name and the preset name in the total number of characters of the preset name according to the comparison between the pre-defined game information and the query information, as the matching degree. When the matching degree is greater than a threshold value, the game type such as "Shooting" that most matches with the game name "INFINxx" is returned to the display apparatus.

As can be seen from the above embodiments, in order to determine the current scene classification, the display apparatus can determine the scenario name from the key frame image based on the recorded video data to be recognized, so as to query the scene classification based on the scenario name. This method of determining the scene classification has a small amount of data processing and a wide range of application, and is especially more accurate for the recognition of game type.

In order to further improve the determining accuracy of the scene classification, the display apparatus can also determine the scene classification based on an image recognition model in some embodiments. That is, in the step of determining the scene classification based on the audio and video data, the display apparatus can obtain a sample image, which is an image extracted from the audio and video data after the external device enters an application scenario. The display apparatus can extract one or more frames of images from the audio and video data as the sample image(s). When the display apparatus extracts multiple frames of images as sample images, there should be a certain sampling interval between the multiple frames of images. For example, the display apparatus can extract one frame of image every 1 s in chronological order. The interval sampling can avoid the excessive similarity of the picture contents among multiple frames of sample images, make the recognition result more universal, and improve the determining accuracy of the scene classification.

Figure 28:
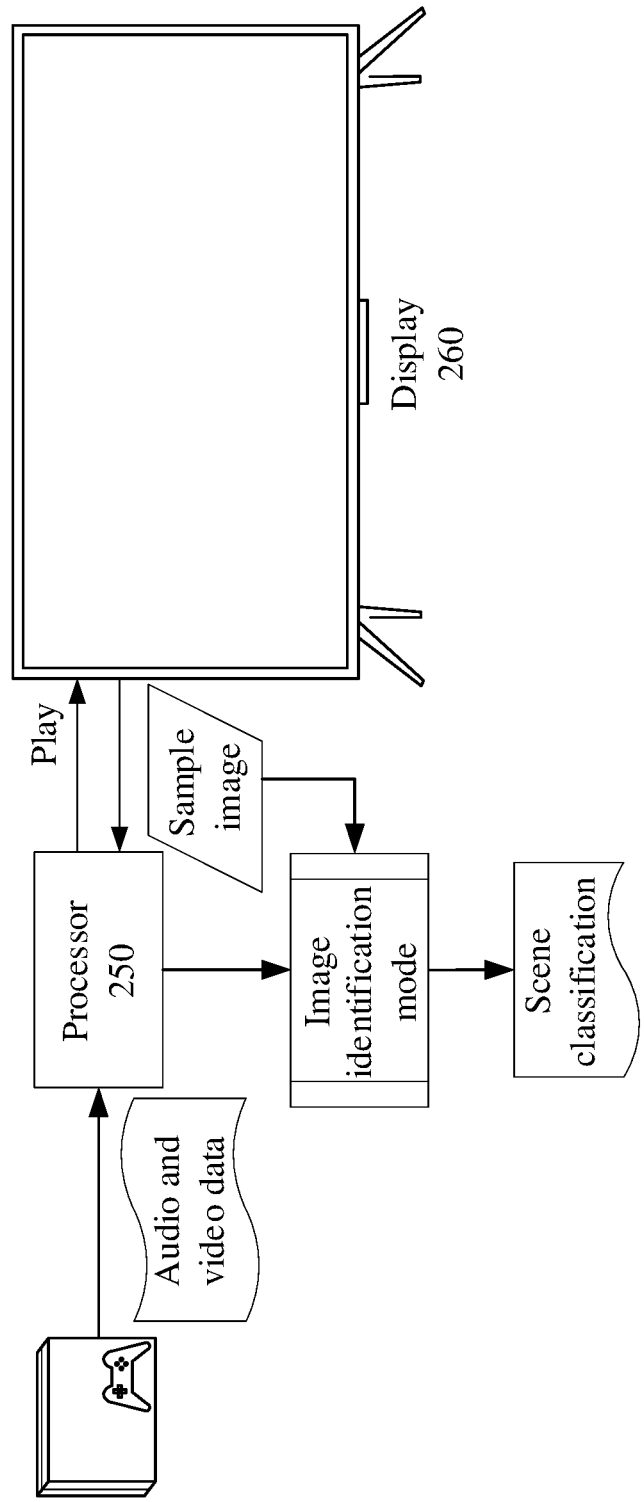
FIG. 28 shows a schematic flowchart of determining a scene classification based on an image recognition model according to some embodiments.

The display apparatus can also obtain a sample image by taking a screenshot. FIG. 28 is a schematic flowchart of determining the scene classification based an image recognition model according to some embodiments of the disclosure. As shown in FIG. 28, in some embodiments, the display apparatus can monitor a command for triggering the scene recognition input from the user; and take a screenshot of the current display picture after the user inputs the command for triggering the scene recognition, to obtain a sample image. For example, the display apparatus can check the accessed device, when the external device is a PC or a game console based on the information such as the model of the external device, the "game optimizer" window can be displayed in the process of playing the game images, and the command input by the user based on the "game optimizer" window can be monitored. When the user clicks the control "sound and picture match" on the window of "game optimizer", the display apparatus can start the background screenshot program to take a screenshot of the currently-displayed game image, so as to obtain a sample image.

After extracting the sample image, the display apparatus can load the image recognition model for determining the scene classification of the sample image, where the image recognition model is a machine learning model obtained by training sample images in a plurality of application scenarios. That is, in some embodiments, the display apparatus can build the image recognition model through sample training before determining the scene classification. In this case, the display apparatus can obtain the trained sample images at first. The trained sample images can be provided by the operator or the server. The trained sample image includes a tag for indicating a scene classification, that is, the information for indicating the scene classification to which the current image content belongs. Different trained sample images can include different image content and different tags. Then the features for image recognition are defined, and include model features and image features, and the features for image recognition are input into the machine learning model as the high-weight information via a stack. Then the trained sample images are input into the machine learning model to obtain the image recognition model after multiple iterations.

For example, the display apparatus can input a large number of different kinds of game images as the trained sample images for training in advance. Since the current game classification standards are different and the game types are diverse, the display apparatus can divide games into four categories based on the game images, including: shooting, action, competitive sports, and leisure. The images of the four categories of games have significant characteristics, that is, the following features for image recognition can be defined for the trained sample images, as shown in Table 4.

TABLE 4

| Game type | Shooting | Action | Competitive Sports | Leisure |
|---|---|---|---|---|
| Mode characteristic | Gun | Cold weapon | Vehicle | None |
| Picture characteristic | Rich color composition | Rich color composition | Realistic scene | Single color element |

The display apparatus can use the machine learning protocol stack to input the above features into the machine learning model as the high-weight information, and take the four types as classification tags. After multiple iterations of learning training, the image recognition model that can output the accurate scene classification result can be obtained.

After the image recognition model is obtained through training, the display apparatus can store the image recognition model obtained through training, so that the display apparatus can invoke the stored image recognition model when determining the scene classification. It should be noted that the training process of the image recognition model requires multiple iterative learning through a large number of sample images, so the computing resources of the display apparatus will be used. Therefore, in some embodiments, the training process of the image recognition model can also be completed by the server 400 in connection with the display apparatus and sent to the display apparatus in a unified manner, so as to relieve the computing pressure of the display apparatus.

The image recognition model obtained through training can be applied to the subsequent determination of the scene classification. The display apparatus can determine the scene classification to which the sample image belongs by itself through the image recognition model. That is, after extracting the sample image and obtaining the image recognition model, the display apparatus can input the sample image into the image recognition model. After calculation of the image recognition model ends, the model output result can be obtained, so the display apparatus can obtain the output result of the image recognition model, where the output result includes the classification probability of the sample image relative to the scene classification; and then extract the scene classification with the highest classification probability in the output result, as the current scene classification of the external device.

As can be seen from the above embodiments, the method of determining the scene classification based on the image recognition model has good generalization and does not require continuous maintenance of the comparison table with a large amount of data, so that the display apparatus can accurately determine the scene classification. Obviously, in the process of determining the scene classification, the display apparatus can also combine the above method using the image recognition model with the above method of determination based on the key frame. In this case, the display apparatus can firstly determine the scenario name through the key frame, and then determine the classification probabilities of multiple frames of sample images via the image recognition model after obtaining the scene classification through querying. When the scene classification result obtained through the key frame is consistent with that obtained by the image recognition model, the scene classification result is determined to be the scene classification to which the current external device belongs, so as to obtain a more accurate determination result.

Figure 29:
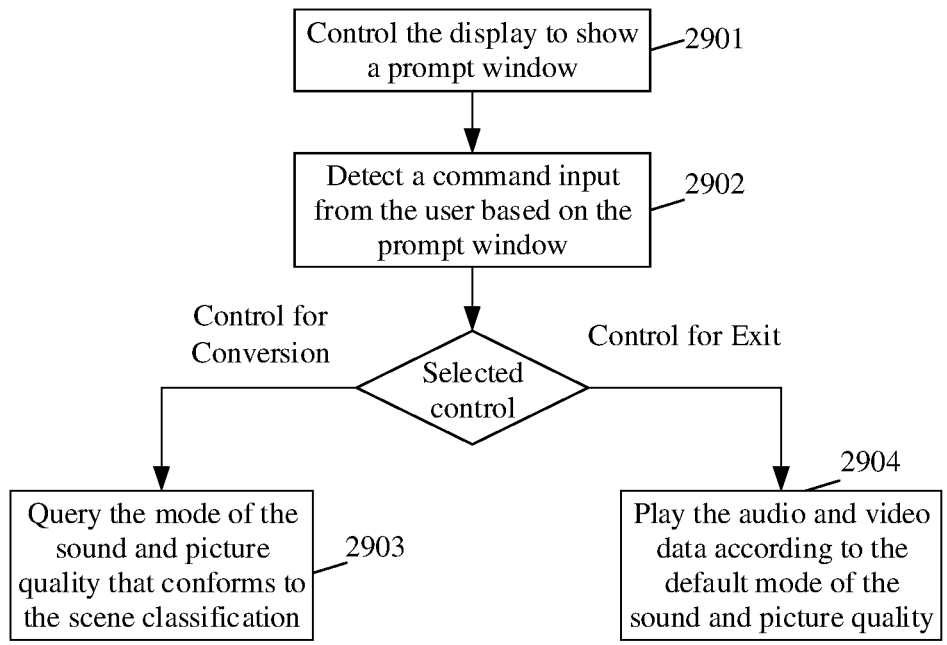
FIG. 29 shows a flowchart of controlling of a prompt window according to some embodiments.
Figure 30:
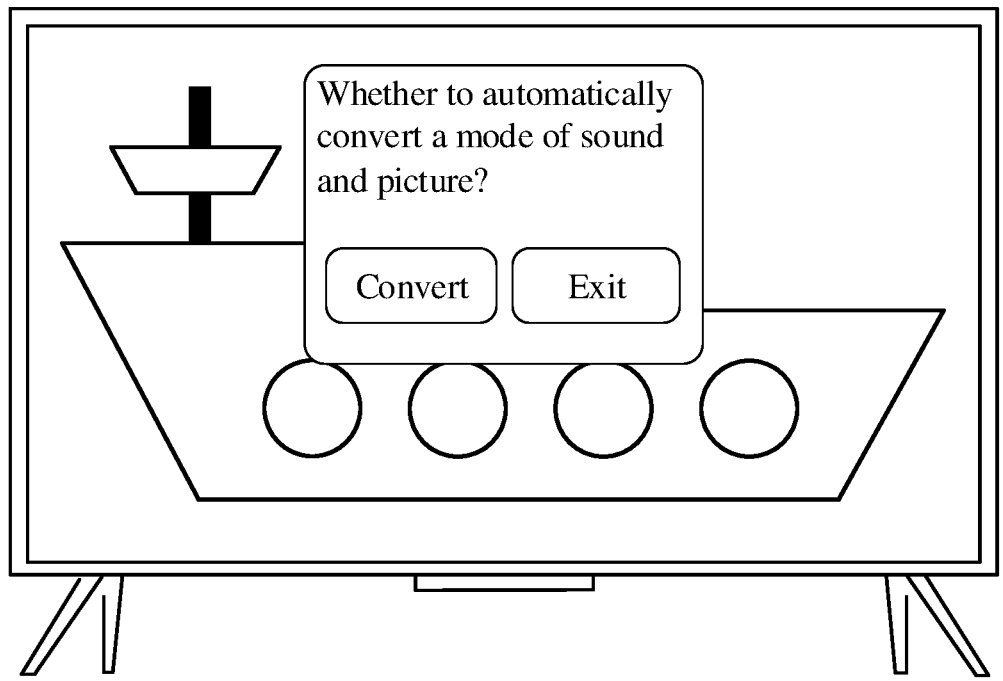
FIG. 30 shows a schematic diagram of an interface including a prompt window according to some embodiments.

In order to meet the demands from different users for picture quality effect, the display apparatus can also prompt the users whether to perform the related operations before the automatic sound and picture quality processing in some embodiments. FIG. 29 is a flowchart of controlling a prompt window according to some embodiments of the disclosure. As shown in FIG. 29, after extracting the scene classification with the highest classification probability in the output result, the at least one processor of the display apparatus can control the display to show a prompt window (2901). FIG. 30 shows a schematic diagram of a prompt window according to some embodiments of the disclosure. As shown in FIG. 30, the prompt window can include a control for conversion and a control for exit. The user can control the display apparatus to perform the automatic sound and picture quality processing based on the control for conversion, or can control the display apparatus not to perform the automatic sound and picture quality processing based on the control for exit.

Therefore, after displaying the prompt window, the display apparatus can detect the command input from the user based on the prompt window (2902). If the command indicates a selection of the control for conversion, the display apparatus is controlled to perform the automatic sound and picture quality processing (2903), in which the step of querying the mode of the sound and picture quality that conforms to the scene classification can be performed so that the audio and video data is played according to the mode of the sound and picture quality. If the command indicates a selection of the control for exit, the display apparatus is controlled to not execute the related program of automatic sound and picture quality processing, and the display apparatus still plays the audio and video data according to the default mode of the sound and picture quality (2904).

For the convenience of explanation, the above description has been made with reference to specific embodiments. However, the above discussion in some embodiments is not intended to be exhaustive or to limit the embodiments to the specific forms disclosed above. Numerous modifications and variations can be obtained in light of the above teachings. The above embodiments are chosen and described in order to better explain the principles and practical applications, so as to enable those skilled in the art to better utilize the embodiments and various variant embodiments suitable for specific use considerations.

What is claimed is:

1. A display apparatus, comprising:
a display configured to display an image from broadcast system or Internet, and/or, a user interface;
an external device interface configured to connect with an external device;
a memory configured to store instructions and data associated with the display; and
at least one processor in connection with the display, the external device interface and the memory, and configured to execute the instructions to cause the display apparatus to:
in response to detecting that the external device is connected via the external device interface, obtain Source Product Description (SPD) data from the external device;
read device identification information from the SPD data, wherein the device identification information comprises a device type and a device model, the device type comprises a game device, and the device model is used for identifying a version of a transmission protocol supported by the game device;
in response to the device model being found in a device management list pre-stored in the display apparatus, switch a version of the transmission protocol in the display apparatus to a version of the transmission protocol matched with the device model stored in the device management list;
in response to the device mode being not found in the device management list, detect a tag for indicating a new version function, wherein the tag for indicating the new version function is a tag added to transmission data during configuration of the new version function in the external device, and the new version function is an additional transmission function of a first version of transmission protocol with respect to a prior second version of transmission protocol;

in response to the tag for indicating the new version function being detected, switch the version of the transmission protocol to the first version, wherein the transmission protocol comprises HDMI protocol; and in response to the tag for indicating the new version being not detected, switch the version of the transmission protocol to the second version;

wherein the at least one processor is further configured to execute the instructions to cause the display apparatus to:

pull up a Hot Plug Detection (HPD) voltage to cause the external device to initiate a configuration process of the new version function in order to detect the tag for indicating the new version function;

read a flag for indicating process initiation within a preset detection period to detect whether the external device is configured with the new version function, wherein the flag for indicating process initiation is a flag field set by the external device in a register;

in response to the flag for indicating process initiation being not found within the preset detection period, mark that the tag for indicating the new version function has not been detected;

in response to the flag for indicating process initiation being found within the preset detection period, send a request for setting a pattern of each data transmission lane to the external device;

receive pattern information returned from the external device;

compare the pattern information with a setting pattern parameter of the new version function;

in response to the pattern information being consistent with the setting pattern parameter of the new version function, mark that the tag for indicating the new version function has been detected; and in response to the pattern information being not consistent with the setting pattern parameter of the new version function, mark that the tag for indicating the new version function has not been detected.

2. The display apparatus according to claim 1, wherein the at least one processor is further configured to execute the instructions to cause the display apparatus to:

after switching the version of the transmission protocol to the first version, receive a media resource signal sent from the external device;

detect an error report in the media resource signal;

in response to no error report being detected within the preset monitoring period, maintain the version of the transmission protocol as the first version;

in response to the error report being detected within the preset monitoring period, switch the version of the transmission protocol to the second version.

3. The display apparatus according to claim 1, wherein the at least one processor is further configured to execute the instructions to cause the display apparatus to:

after switching the version of the transmission protocol to the first version, detect an image resolution in the media resource signal;

in response to the image resolution being equal to a preset resolution in the new version, proceed to detect the error report in the media resource signal;

in response to the image resolution being not equal to the preset resolution in the new version, switch the version of the transmission protocol to the second version.

4. The display apparatus according to claim 1, wherein the at least one processor is further configured to execute the instructions to cause the display apparatus to perform:

while switching the version of the transmission protocol to the second version, detect a transmission bit rate sent from the external device, wherein the transmission bit rate is a transmission parameter additionally configured in the second version of transmission protocol relative to a third version of transmission protocol;

in response to the transmission bit rate being detected, switch the version of the transmission protocol to the second version;

in response to the transmission bit rate being not detected, switch the version of the transmission protocol to the third version.

5. The display apparatus according to claim 1, wherein the at least one processor is further configured to execute the instructions to cause the display apparatus to:

while switching the version of the transmission protocol to the second version, detect a clock frequency of a media resource signal sent from the external device;

in response to the clock frequency conforming to a rate specified in the second version, switch the version of the transmission protocol to the second version;

in response to the clock frequency conforming to a rate specified in a third version of the transmission protocol, switch the version of the transmission protocol to the third version.

6. The display apparatus according to claim 1, wherein the at least one processor is further configured to execute the instructions to cause the display apparatus to:

after switching the version of the transmission protocol, control the display to show the version of the transmission protocol supported by the external device on the user interface;

extract the device information of the external device and the transmission protocol version supported by the external device; and store the device information and transmission protocol version in the device management list.

7. A method for a display apparatus, comprising:

in response to detecting that an external device is connected via an external device interface of the display apparatus, obtaining Source Product Description (SPD) data from the external device; wherein the display apparatus further comprises a display configured to display an image from broadcast system or Internet, and/or, a user interface;

reading device identification information from the SPD data, wherein the device identification information comprises a device type and a device model, the device type comprises a game device, and the device model is used for identifying a version of a transmission protocol supported by the game device;

in response to the device model being found in a device management list pre-stored in the display apparatus, switching a version of the transmission protocol in the display apparatus to a version of the transmission protocol matched with the device model stored in the device management list;

in response to the device mode being not found in the device management list, detecting a tag for indicating a new version function, wherein the tag for indicating the new version function is a tag added to transmission data during configuration of the new version function in the external device, and the new version function is an additional transmission function of a first version of transmission protocol with respect to a prior second version of transmission protocol;

in response to the tag for indicating the new version function being detected, switching the version of the transmission protocol to the first version, wherein the transmission protocol comprises HDMI protocol; and in response to the tag for indicating the new version being not detected, switching the version of the transmission protocol to the second version;

wherein the method further comprises:

pulling up a Hot Plug Detection (HPD) voltage to cause the external device to initiate a configuration process of the new version function in order to detect the tag for indicating the new version function;

reading a flag for indicating process initiation within a preset detection period to detect whether the external device is configured with the new version function, wherein the flag for indicating process initiation is a flag field set by the external device in a register;

in response to the flag for indicating process initiation being not found within the preset detection period, marking that the tag for indicating the new version function has not been detected;

in response to the flag for indicating process initiation being found within the preset detection period, sending a request for setting a pattern of each data transmission lane to the external device;

receiving pattern information returned from the external device;

comparing the pattern information with a setting pattern parameter of the new version function;

in response to the pattern information being consistent with the setting pattern parameter of the new version function, marking that the tag for indicating the new version function has been detected; and in response to the pattern information being not consistent with the setting pattern parameter of the new version function, marking that the tag for indicating the new version function has not been detected.

8. The method according to claim 7, further comprising:

after switching the version of the transmission protocol to the first version, receiving a media resource signal sent from the external device;

detecting an error report in the media resource signal;

in response to no error report being detected within the preset monitoring period, maintaining the version of the transmission protocol as the first version;

in response to the error report being detected within the preset monitoring period, switching the version of the transmission protocol to the second version.

9. The method according to claim 7, further comprising:

after switching the version of the transmission protocol to the first version, detecting an image resolution in the media resource signal;

in response to the image resolution being equal to a preset resolution in the new version, proceeding to detect the error report in the media resource signal;

in response to the image resolution being not equal to the preset resolution in the new version, switching the version of the transmission protocol to the second version.

10. The method according to claim 7, further comprising:

while switching the version of the transmission protocol to the second version, detecting a transmission bit rate sent from the external device, wherein the transmission bit rate is a transmission parameter additionally configured in the second version of transmission protocol relative to a third version of transmission protocol;

in response to the transmission bit rate being detected, switching the version of the transmission protocol to the second version;

in response to the transmission bit rate being not detected, switching the version of the transmission protocol to the third version.

11. The method according to claim 7, further comprising:

while switching the version of the transmission protocol to the second version, detecting a clock frequency of a media resource signal sent from the external device;

in response to the clock frequency conforming to a rate specified in the second version, switching the version of the transmission protocol to the second version;

in response to the clock frequency conforming to a rate specified in a third version of the transmission protocol, switching the version of the transmission protocol to the third version.

12. The method according to claim 7, further comprising:

after switching the version of the transmission protocol, controlling the display to show the version of the transmission protocol supported by the external device on the user interface;

extracting the device information of the external device and the transmission protocol version supported by the external device; and storing the device information and transmission protocol version in the device management list.

* * * * *